United States Patent [19]

Blaettner et al.

[11] Patent Number: 5,113,104
[45] Date of Patent: May 12, 1992

[54] STRUCTURED PRODUCT DYNAMOELECTRIC MACHINE

[75] Inventors: Harald E. Blaettner, Hendersonville, Tenn.; Richard F. Uhen; Robert E. Ellis; Eldon R. Cunningham; Michael J. Usher; Joseph E. Miller, all of Ft. Wayne, Ind.

[73] Assignee: General Electric Company, Fort Wayne, Ind.

[21] Appl. No.: 423,827

[22] Filed: Oct. 19, 1989

[51] Int. Cl.⁵ .............................................. H02K 5/16
[52] U.S. Cl. ...................................... 310/90; 310/45; 310/51; 310/89; 310/154; 310/239; 384/210; 384/428
[58] Field of Search ............... 310/90, 89, 154, 91, 310/45, 51, 239, 242, 58, 59, 71, 233, 42; 384/428, 210

[56] References Cited

U.S. PATENT DOCUMENTS

| | | | |
|---|---|---|---|
| 1,939,032 | 12/1933 | Aufiero | 310/239 U X |
| 2,842,692 | 7/1958 | Johnson et al. | 310/239 |
| 3,025,421 | 3/1962 | Sievert | 310/245 |
| 3,026,432 | 3/1962 | Baumhart | 310/239 |
| 3,430,084 | 2/1969 | Hall et al. | 310/239 U X |
| 3,604,961 | 9/1971 | Seldlinger | 310/51 |
| 3,624,434 | 11/1971 | Dafler et al. | 310/90 |
| 3,819,967 | 6/1974 | Binder | 310/236 |
| 3,864,821 | 2/1975 | Ito et al. | 29/597 |
| 3,887,826 | 6/1975 | Apostoleris | 310/43 |
| 3,889,141 | 6/1975 | Merriam | 310/154 |
| 4,071,794 | 1/1978 | Schoen | 310/154 |
| 4,186,319 | 1/1980 | Dochtermann | 310/59 |
| 4,326,757 | 4/1982 | Ozaki | 310/90 |
| 4,389,588 | 6/1983 | Rankin | 310/242 |
| 4,475,053 | 10/1984 | Mayer | 310/239 |
| 4,538,085 | 8/1985 | Tanaka | 310/239 |
| 4,616,151 | 10/1986 | Pryjmak | 310/216 |
| 4,694,214 | 9/1987 | Stewart | 310/239 |
| 4,700,098 | 10/1987 | Kawashima | 310/186 |
| 4,759,526 | 7/1988 | Crawford et al. | 310/89 |
| 4,800,313 | 1/1989 | Warner et al. | 310/242 |
| 4,806,025 | 2/1989 | Kamiyama et al. | 384/202 |
| 4,833,353 | 5/1989 | Hansen | 310/51 |
| 4,887,916 | 12/1989 | Adam et al. | 310/90 |
| 4,933,582 | 6/1990 | Hata et al. | 310/89 |
| 4,935,655 | 6/1990 | Ebner | 310/154 |
| 4,961,016 | 10/1990 | Peng et al. | 310/59 |

Primary Examiner—R. Skudy
Attorney, Agent, or Firm—Ralph E. Krisher, Jr.

[57] ABSTRACT

A structured product family of dynamoelectric machines for use in a plurality of applications has a frame with a closed end, and a set of permanent magnets is adhesively secured within the frame. An armature disposed in the frame for interaction with the permanent magnets includes a shaft, a core having a set of winding receiving slots therein, and a commutator. During manufacturing and assembly, stress on the motor shaft and commutator is minimized. A brush plate is associated with the frame for locating a set of brushes relative to the commutator, and an end shield is secured to the frame opposite its closed end. At least one freely aligning bearing assembly disposed in the end shield for freely aligning the shaft and including a bearing and a retainer having predetermined conditions preset with the retainer being adhesively secured to the end shield. A bracket is adhesively secured to the frame for connecting the dynamoelectric machine in anyone of the applications; and a novel brush assembly is provided. Specifically, four members attached to the brush boxes are inserted through the D slots and are then crimped so that minimum stress is introduced into the brush plate. The armature commutator is first rough finished, the armature is then balanced and the commutator surface is final finished last prior to assembly into the frame. The motor has a relatively stiff end shield having a freely aligning bearing adhesively connected therein. The freely-aligning bearing has a predetermined set of conditions preset and held therein by an adhesive. These predetermined conditions are repeatedly duplicated in a plurality of end shields. An axial vibration reduction means which comprises in part a thrust compensation system is operative to bias the armature toward the bearing means in the frame and thus reduce the noise generated by the axial movement of the armature. A mounting flange is adhesively connected to the frame.

Also disclosed are methods of assembling various subcomponents such as the commutator to the shaft, the magnets to the frame and the freely-aligning bearing means in the frame and end shield sockets.

29 Claims, 7 Drawing Sheets

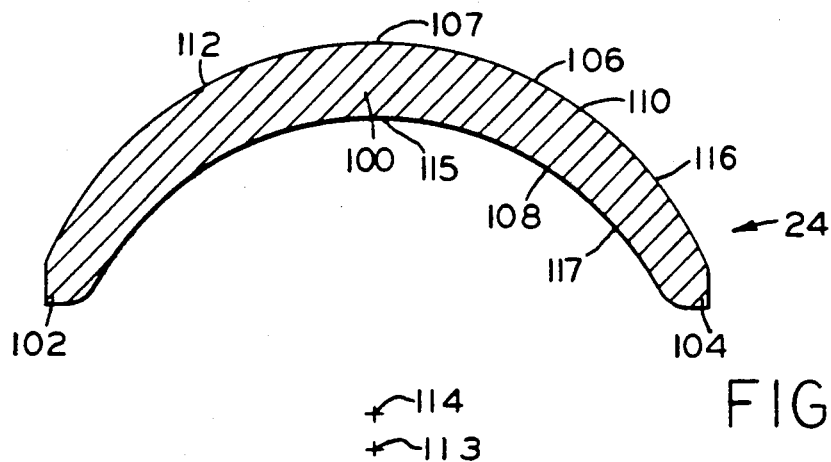
FIG._3A
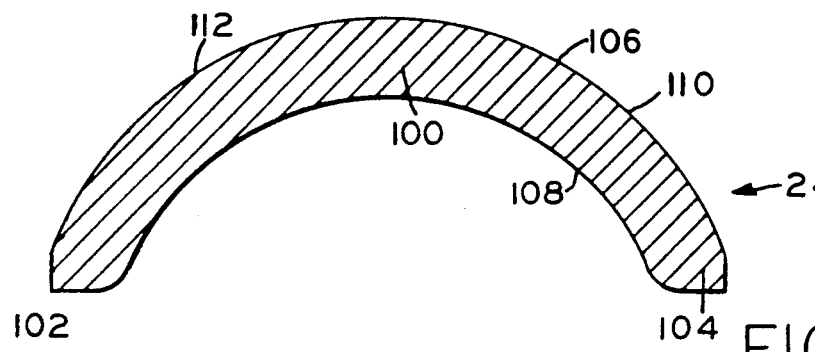
FIG._3B
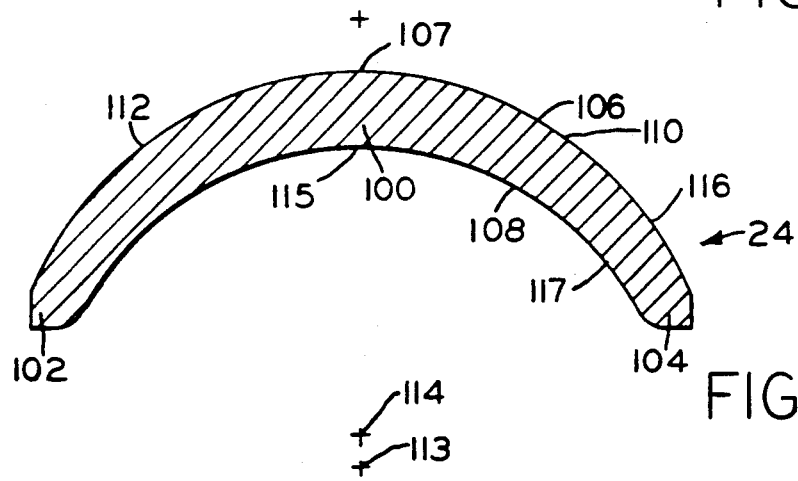
FIG._3C
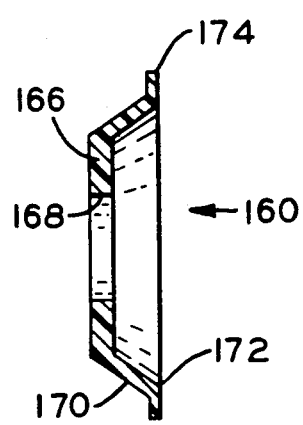
FIG._6

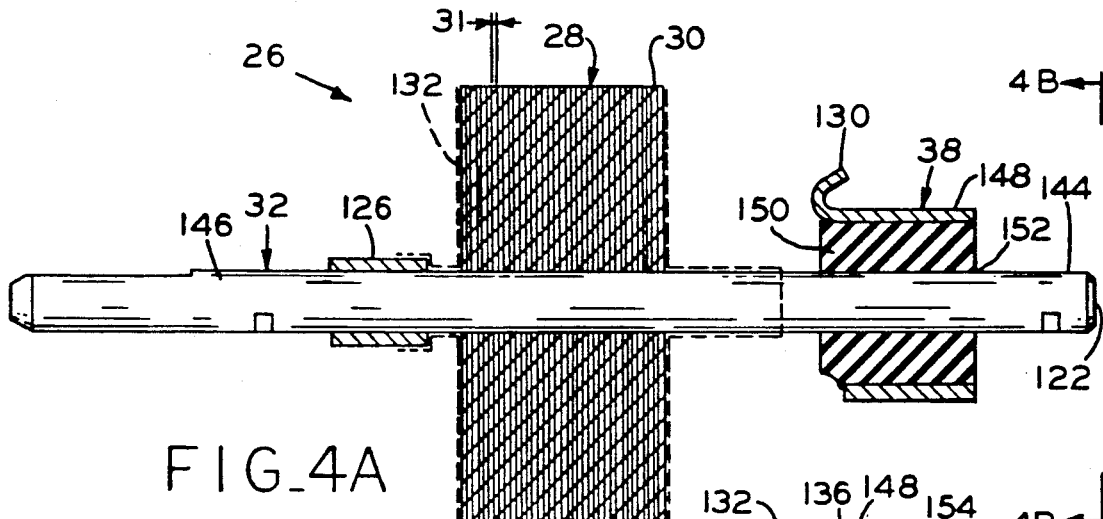
FIG_4A
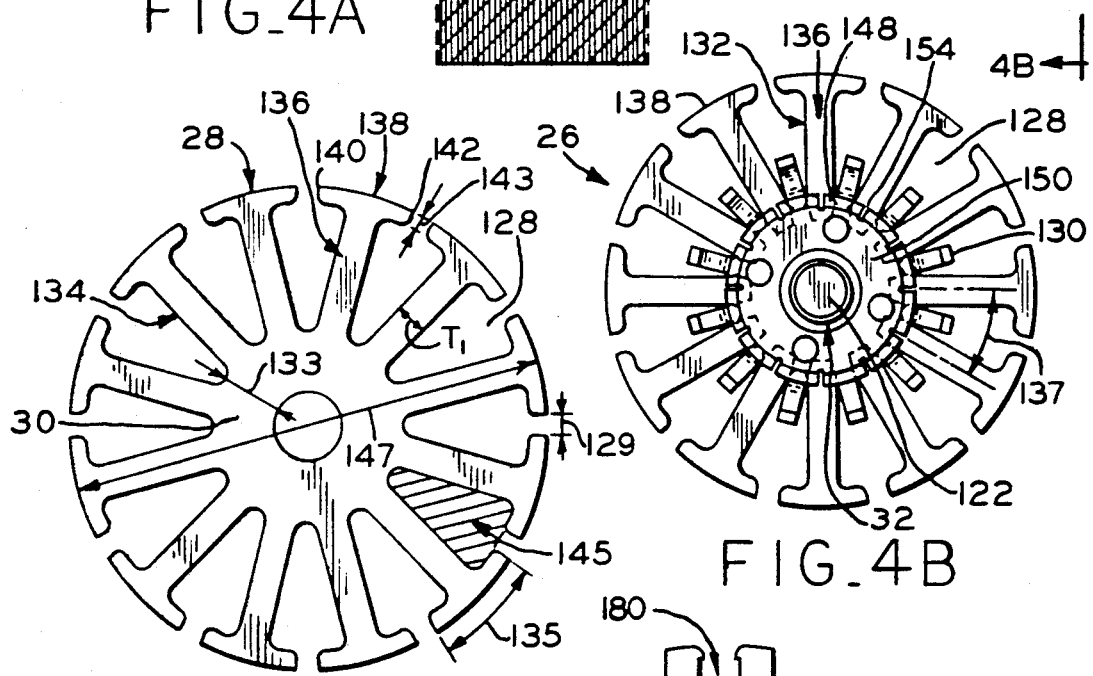
FIG_4B
FIG_5
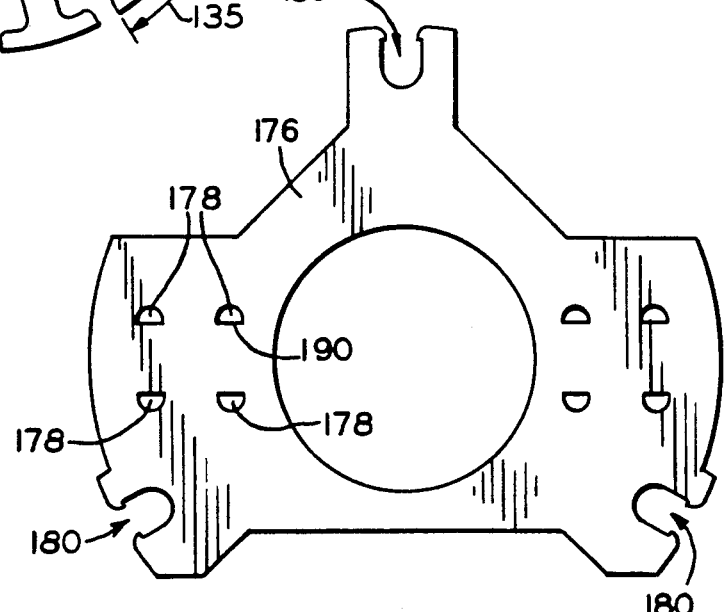
FIG_7

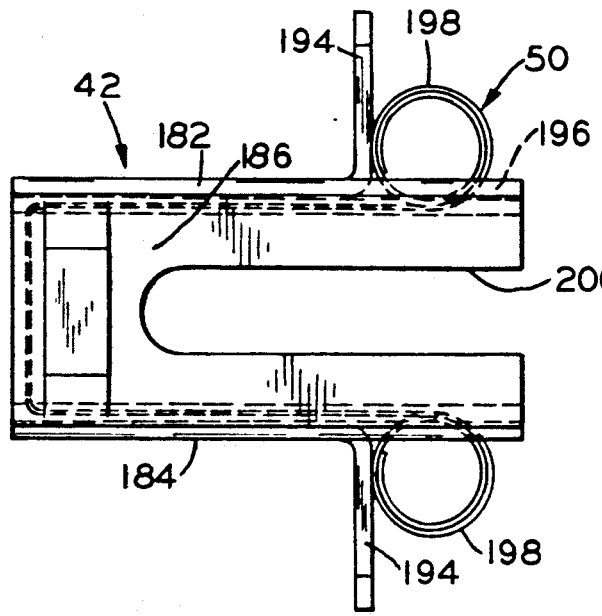
FIG_8A
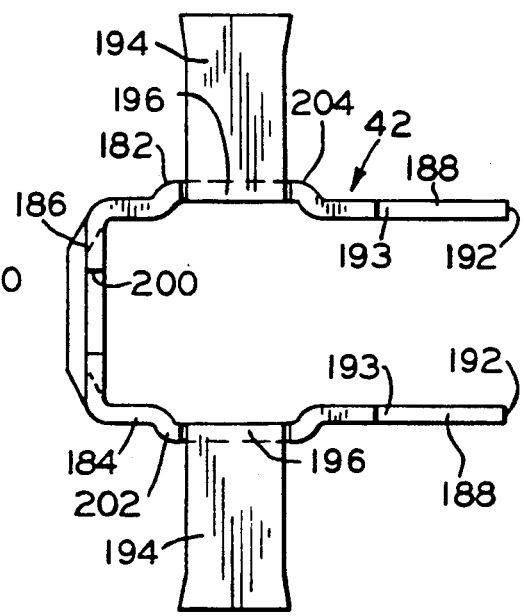
FIG_8B
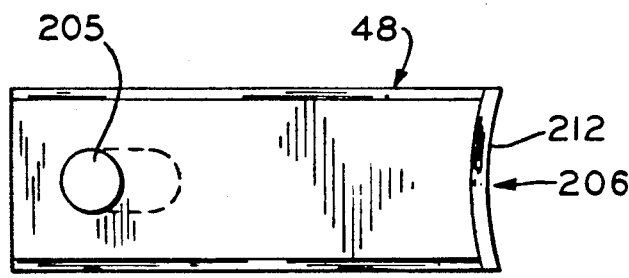
FIG_9A
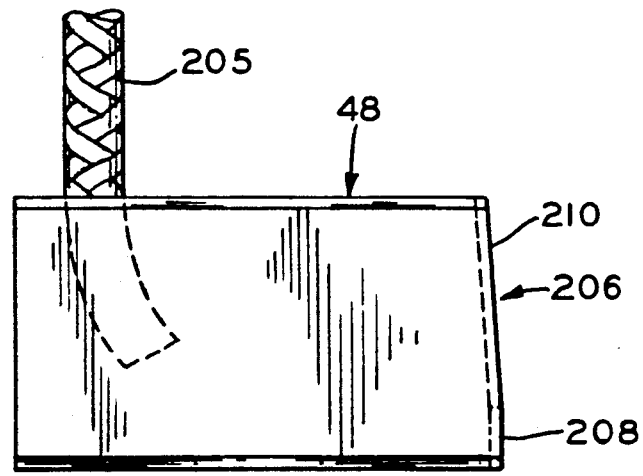
FIG_9B

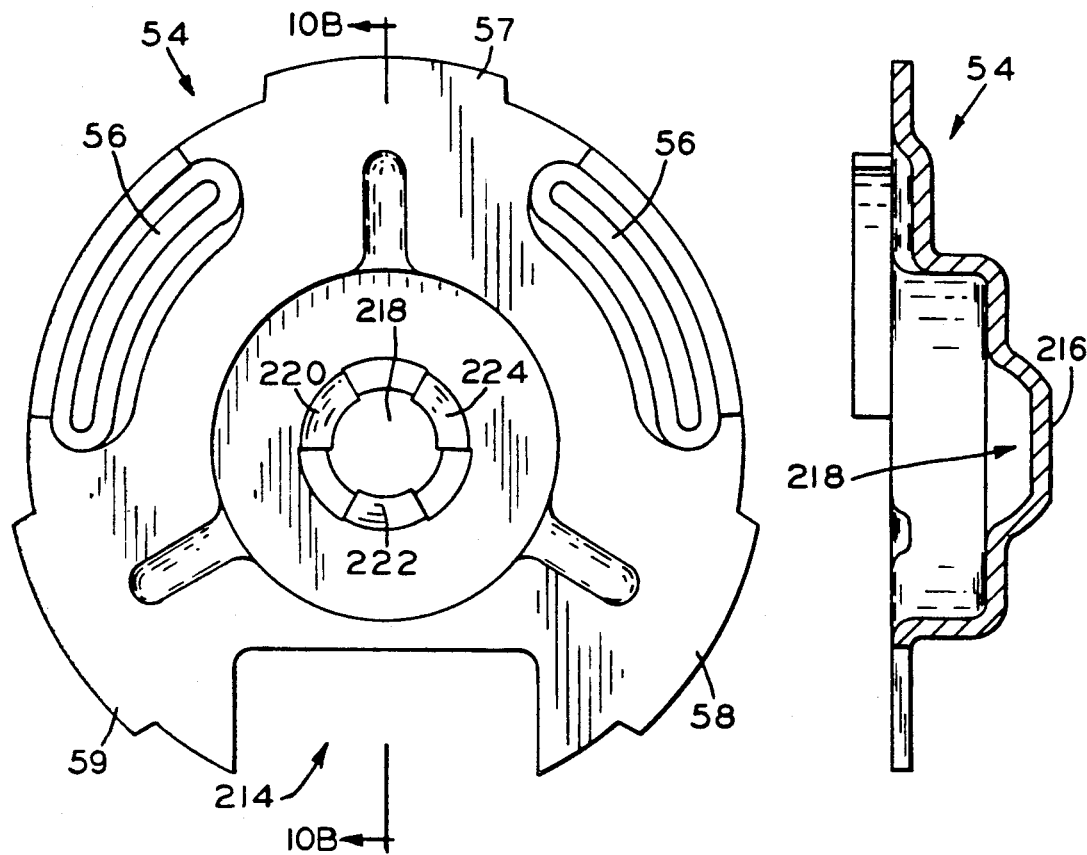
FIG_10A  FIG_10B
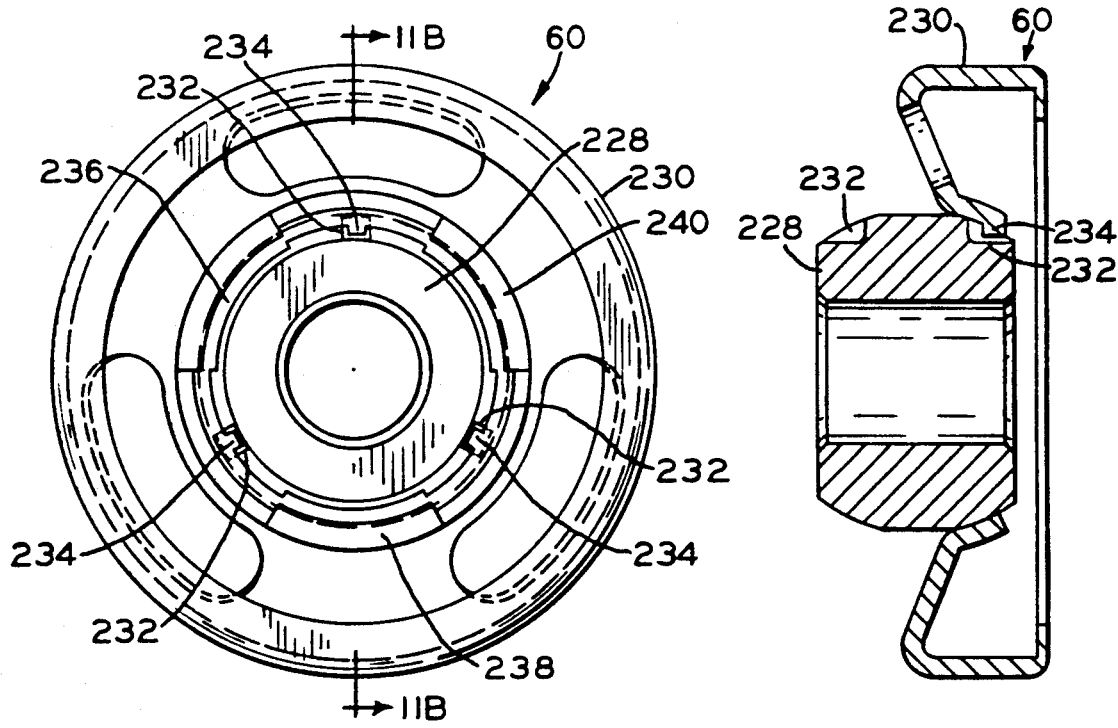
FIG_11A  FIG_11B

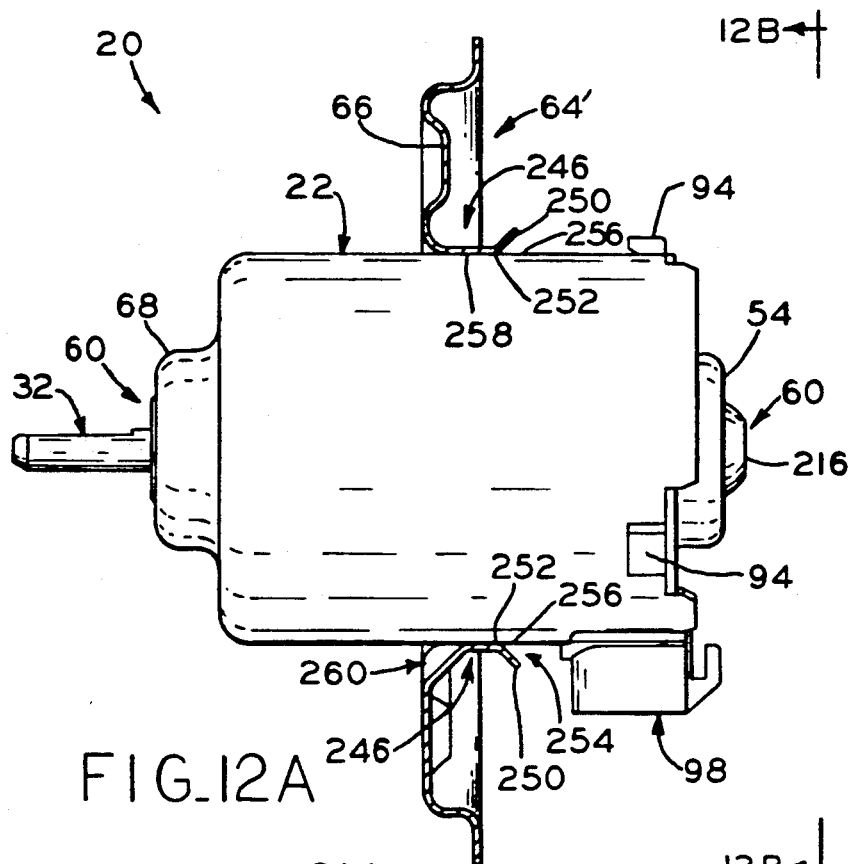
FIG_12A
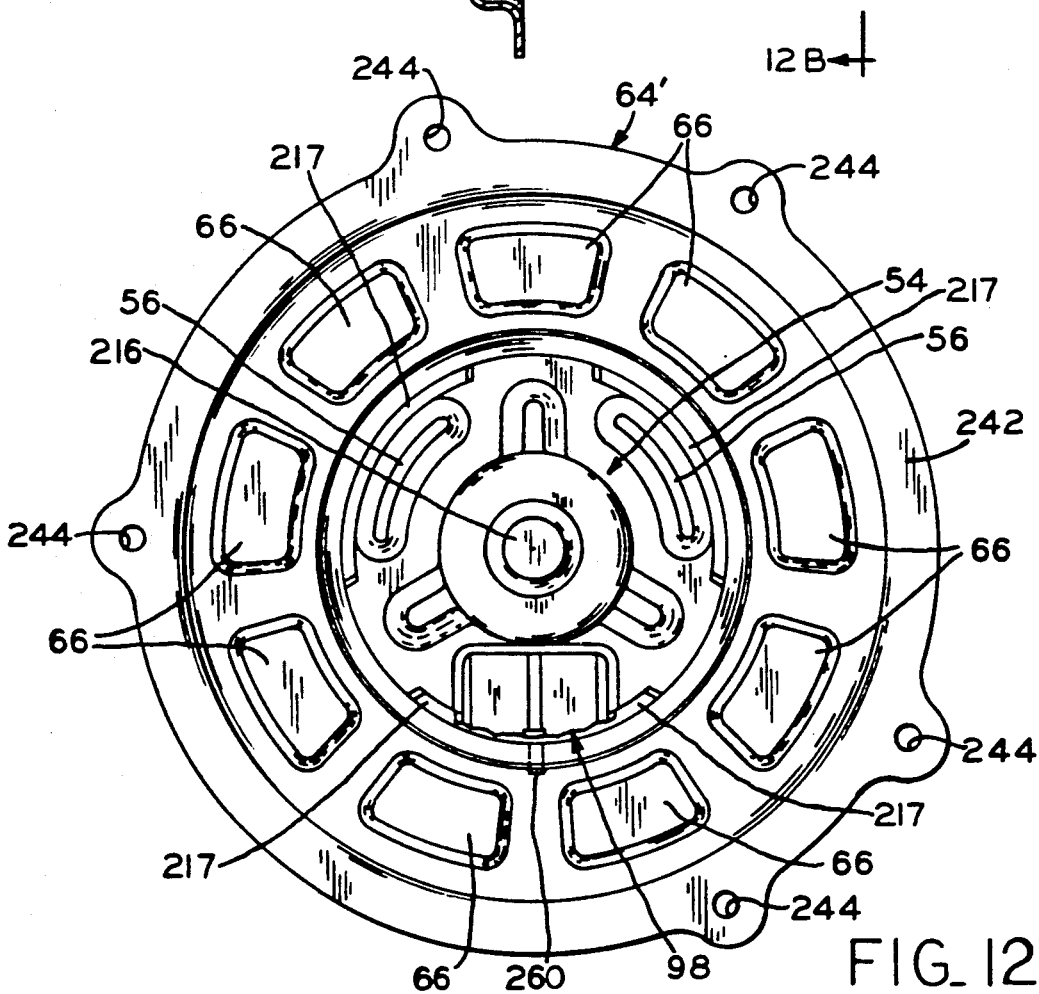
FIG_12B

1

STRUCTURED PRODUCT DYNAMOELECTRIC MACHINE

BACKGROUND OF THE INVENTION

The present invention relates to small motors and methods of making the same and, more specifically, to a structured product family of motor models that utilize a maximized number of common, optimized, multiple application, cost minimized, components in a cost minimized manufacturing process for utilization in a plurality of different applications, including automotive applications.

Traditionally, in industries using electric motors such as for example the automotive industry, each specific motor application required a considerable number of individual components with few, if any, common components between applications. For example, there typically were different motors for each model of automobile and within automobile models, there typically were different motors for heater only blower systems or air conditioning blower systems and for front wheel drive models as well as some rear wheel drive models, there was typically a different motor for the radiator cooling fan.

One specific example of this in the automotive industry was the practice of utilizing three components for the motor frames, a base component, a rear end shield component, and a combined unitary front end shield-mounting flange component. This particular practice resulted in separate tools for each different end shield-mounting flange integral combination for each application which required a different axial position of the mounting flange relative to the motor frame. Tools for the combined integral end shield-mounting frame were quite expensive.

Thus, at least one major automotive manufacturer, it was conventional have nearly as many sets of motor manufacturing tooling as there were different motor applications. This conventional system was wasteful of resources in that it required repetitive, short duration production runs using a plurality of tooling, thereby raising the unit cost of producing the required number of different motors to an unacceptable level.

Thus, in order to reduce costs and manufacturing complexities, it is desirable to develop a "structured product" motor having a minimized number of total components which with minor component and manufacturing variations could be used to produce motors for a maximized number of different automotive applications that are capable of operating with minimum noise, highly durable, and have substantially lower unit production cost.

The brush assembly plates for motors and generators alike vary in design, but in general comprise boxes to house the brushes, spring means to apply pressure to the brushes to urge them against the commutator, electrical leads to provide a current path to the brushes and a mounting surface holding these elements that also provides a means to secure the entire assembly to the motor in such a manner as to place the brushes in a proper working relationship with the commutator.

The useful life of electrical motors that typically find applications in appliances, tools, and automotive vehicles, as well as many industrial applications, is usually a function of the length of the carbon brush, brush rate of wear, and, in the case of replaceable brushes, the number of times the brushes can be replaced before the commutator begins to severely wear.

It is known that the rate of wear of the brushes is a function of the load, the speed of the motor, and more importantly, the spring pressure that is applied to the brush to keep it in bearing contact with the commutator. Accordingly, it will be appreciated that with too much spring pressure, the mechanical wear of bath the brush and commutator will become excessive, a film having undesirable characteristics is formed on the commutator, and the brush life markedly falls. On the other hand, with too little pressure applied, the electrical arcing due to the high contact resistance and the mechanical abrasion due to brush and commutator surface bounce greatly reduces potential brush and commutator surface life by destroying the brush and the commutator surface.

A typical automotive motor brush configuration comprises a helical spring bearing on the carbon brush, the two elements being contained in a box-like holder such that the brush is urged against the commutator. Although this design is commonly utilized, it has limitations. Specifically, the pressure produced by a helical spring is a function of its compression or extension. Therefore, when the brush assembly is new, and the brushes are at their maximum length, the spring is at its fullest compression and the pressure therefore is at its highest. At the end of the brush life, the spring extension is at its greatest and the pressure now on the commutator is below that desired. Therefore, depending on the spring rate, only a portion of the brush wear is in the optimal spring pressure range.

The conventional motor brush spring used in automotive applications tends to have a nonconstant force. In other words, the harder and the further you pull the spring back, the harder it pushes on the resistance. Thus, if the spring is moved a short distance from its normal at rest position, there will be a relatively lower force generated by the spring against the resistance. The further you move the spring away from its at rest position, the greater the force exerted by the spring against the moving force. However, in applying pressure to brushes on a brush box assembly plate, it is desirable that a constant force be exerted against the brush urging the brush against the commutator throughout the life of the brush and especially after initial wear in.

An additional problem with conventional motor brush springs in automotive applications is the space they occupy. Specifically, there is only so much space available within the motor frame to house all of the motor components. Conventional spring means such as coil springs take up valuable space in the brush area.

With regard to a conventional helical spring which has a finite collapsed length and which is generally enclosed in the brush box located behind the brush, the space required by the collapsed spring necessitates that a shorter brush per length of brush box be used.

Thus, it is desirable that a spring means be developed which not only develops a rather constant force, but also occupies minimum space in order to allow the brush sizes to be increased and increase the life of the motor.

In certain applications, in order to overcome these shortcomings, a ribbon spring that is essentially wound like a clock spring and is set to unwind in such a direction as to hold the brush against the commutator has been utilized. Since ribbon springs have an essentially constant force, the ideal pressure range can be obtained thereby obtaining optimum contact between the brush and the commutator throughout the life of the brush.

With the ribbon spring, the coils providing the engaging force are mounted outside of the brush holder on either side thereof and hence only a thin ribbon section of the spring is located in the brush box behind the brush. Consequently, this configuration provides extra space for a longer brush and hence results in the much desired longer brush life.

However, problems have arisen with brush box/ribbon spring designs in that occasionally erratic brush life results due to the fact that the walls confining the spring coil portions tend to impede brush movement in the box perhaps because of vibration in the back and forth motion of the brush and the unwinding rotation of the coil portions. Brush impediment may also be due to the coil portions riding back and forth, or in and out, as well as dereeling in their receptacles.

It is known and appreciated that it is essential that the brush follow the commutator at all times. However, no matter how well or fine the commutator, the shaft, and the bearing surfaces are machined, some eccentricity will remain in the motor. Accordingly, it is very important to maintain not only the spring pressure, but also a large degree of freedom of movement of the whole system connected to the brushes.

With conventional designs utilizing ribbon springs, there is a tendency for the brush to hit the brush box wall and drag on the bottom or floor thereof. Accordingly, debris such as carbon, dust and the like tends to be deposited in these areas which further tends to reduce the freedom of the system to move.

Brush boxes designed to overcome these shortcomings, such as those disclosed in U.S. Pat. No. 4,800,313 to Warner et al., involved the arrangement in which the outer wall of the receptacle or brush box was eliminated and at least two semicircular surfaces were provided for establishing point or line contacts with each ribbon spring coil portion.

While this system did somewhat solve the difficulties involved with the application of the ribbon spring design, a need still remained for a simplified brush box ribbon spring system which: would increase the brush life by providing the essentially constant force of the brush on the commutator once the entire brush was in contact with the commutator; would virtually eliminate the tendency of the brush to become hung up in the brush box due to debris, such as residue, carbon, dust and the like; and keep the coils of the ribbon spring relatively free to rewind toward their at rest conditions without binding or being impaired by any component of the brush box or the debris from the system as the brush wears against the commutator.

One of the popular brush plate designs, especially for small fractional horsepower motors, utilizes a molded brush plate member of a one-piece construction formed from a high temperature resistant plastic which is electrically nonconductive. The member has the brush boxes formed thereon as well as various openings for securing it to the motor housing and for receiving an extending armature shaft having a commutator secured thereto.

A source of noise in the conventional automotive small electric motor has been the brush. Specifically, the interaction between the brush and the commutator has generated a considerable amount of noise because of the shape of the brush itself. Specifically, one source of noise is the edge of the brush catching in the commutator slots, thus not only resulting in noise, but also in momentary increases in the current density as the brush skips a little over the commutator when the brush is caught in the slot.

An additional source of noise in the conventional electric motor has been transmitted through the brush box assembly plate to the frame. Specifically with a rigid connection between the plate and the frame, vibrations generated between the brush and the commutator transmitted to the plate and then to the frame have produced an unacceptable level of noise in the conventional design.

Thus, it is desirable to develop a connection between the brush assembly plate and the frame which reduces and isolates the vibrations generated by the brush commutator interaction and which are transmitted to the frame.

Generally, in prior bearing systems utilized in motors for automotive applications, automatic self-aligning bearing material which is held under the effect of resilient force by allowing a plurality of pawls formed on a metal holder or retaining plate to come in pressure contact with the outer peripheral surface thereof has been employed. It is known that the alignment torque required for the purpose of self-aligning of the ball metal increases correspondingly as resilient force on the pawls increases. Accordingly, it is preferable that the resilient force of the pawls be reduced in order to assure that automatic self aligning is effected smoothly.

However, when the resilient force of the pawls is reduced, they cannot satisfactorily oppose a load exerted on the ball metal in the radial direction or in the axial direction, resulting in a nonreliable supporting function being maintained. Thus, it is preferable that the resilient force of the metal holder be kept low in order to have a reduced alignment torque, while it is also preferable that it be kept high in order to satisfactorily oppose a load exerted on the ball metal. Accordingly, the resilient force of the metal holder is required to have two contradictory characteristics. However, since the conventional metal holder was so constructed that each of the pawls had the same resilient force, it couldn't have both the high and the low resilient forces required.

In view of the above, the existent state relative to the metal holder is such that reliable shaft support is considered first and the function of smooth self-aligning is somewhat sacrificed. Consequently, the alignment torque required for the ball metal is increased and thus the desired self-aligning cannot be easily achieved. Another drawback is that when the metal holder is so fitted that the pawls have a predetermined resilient force, it has a narrow range of adjustment and satisfactory fitting is achieved only with much difficulty.

Other attempts to overcome these shortcomings have included providing a holding device for an automatic self-aligning ball metal of which the outer peripheral surface is spherical, the ball metal being adapted to be held by means of metal holder, wherein the metal holder is formed with at least two kinds of pawls having a different intensity resilient force. The pawls having a lower intensity of resilient force come into contact with the outer peripheral surface of the ball metal earlier than those having a higher intensity of resilient force in order to resiliently hold the ball metal.

The pawls extend in the radial direction inwardly of an area located in the proximity of the outer periphery thereof. The pawls having a lower intensity of resilient force and the pawls having a higher intensity of resilient force are alternately arranged in the peripheral direction of the metal holder.

Usually the pawls having a higher intensity of resilient force have a width wider than those having a lower intensity of resilient force. Alternatively, the pawls having a higher intensity of resilient force may be thicker than those having a lower intensity of resilient force on the assumption that they have the same width.

Bearing retainers constructed in the above described later developed manner whereby the resilient holding force exerted on the bearing by the retainer functions weakly at the time of automatic self-aligning, but functions intensely when there's a load applied to the ball metal in the axial direction, are shown in U.S. Pat. No. 4,806,025, issued Feb. 21, 1989, to Kamiyama, et al. While the automatic self aligning bearings described in the above patent were (advances over the known art, solutions to the problems of repeatability and the amount of force required to align the bearings have remained elusive.

In conventional motors having permanent magnet field poles, reluctance torques are introduced during rotation of rotary errantries under the poles. The reluctance torque is a position-sensitive periodic-with-rotation torque which occurs in the absence of excitation of the armature. Occurrence of this torque is due to the interaction of the permanent magnet field and the slots in the armature. Because of these slots, the reluctance of the magnetic flux varies at different points around the armature. This means that the magnetic energy in the air gap field between poles and the armature is not uniform at all points circumferentially around the armature. This occurrence of reluctance torque is manifested by pulsations, throbbing and irregularity in rotational speed which are objectionable at all rotational speeds, but are most noticeable and objectionable at low speeds. Previously, attempts have been made to reduce reluctance torque in direct current motors by such means as for example skewing the armature slots. However, skewing adds complexities to the armature manufacturing process.

The reluctance torque phenomenon occurs inherently in all energized motors which have a change in the air gap as a function of rotation. It is desirable to control reluctance torque especially in automotive applications while minimizing the number of different components necessary to accomplish the maximum number of applications and minimizing product and process cost and complexities.

Another problems with prior conventional motors, especially those utilized for automotive radiator cooling applications, has been durability. Specifically, one motor design failed after approximately 500 hours of usage which roughly corresponds to 40,000 miles of automobile driving. These prior motors failed primarily because the motor brushes had been used up. Thus, in order to extend the useful motor life used in such an application, it is desirable to extend the brush life.

Another determined shortcomings of this prior motor utilized as a radiator cooling motor was bearing failure possibly due to bearing lubrication failure. Thus, it would be desirable to develop a lubrication system or a bearing system for the motor which extended the life of the bearing systems.

Accordingly, there is a need for an improved motor and methods of making the motor and its various components. Such a motor should be a structured product utilizing a minimum number of components to accomplish a maximum number of different applications including automotive applications and should: produce significantly reduced noise levels in comparison to prior motors especially those for automotive applications; have a predetermined set of conditions preset in at least one bearing system which is repeatedly duplicatable in a plurality of other individual bearing systems; have an improved brush card assembly; have precisely contoured and beveled brushes which significantly reduce the noise produced by the brush/commutator interaction; have precisely dimensioned and aligned brush boxes; have a brush box/brush plate combination which significantly reduces stresses in the plate; have the laminations assembled to the shaft such that a minimum amount of stress is applied to the shaft; have a commutator assembled to the shaft such that a minimum amount of stress is applied to the commutator itself or to the shaft; have an armature which is first rough finished, balanced, and then final finished to insure precise dimensional tolerances balance; have oil slingers which are part of the armature; have a stiff end shield which reduces the noise produced by the motor; have precisely designed and contoured magnets and precisely designed laminations whose interaction reduces reluctance torque; and have an adhesively mounted flange/frame combination which significantly reduces the noise produced by the motor and reduce tooling costs.

SUMMARY OF THE INVENTION

In carrying out the present invention in preferred forms thereof, we provide a structured product motor for automotive applications and methods of assembling various sub-components of the motor. An illustrated embodiment of the invention disclosed herein, is in the form of a motor intended for use as a motor to power an automotive heater fan, an automotive air conditioner fan or an automotive radiator cooling fan.

Each structured motor comprises: a frame having bearing receiving means and at least two magnet means operatively adhesively positioned therein; armature means including a core formed from a plurality of laminations, a shaft and commutator means having slots, operatively positioned in the frame, for interacting with the magnet means; brush plate assembly means, operatively connected to the frame, for precisely locating at least two brush means relative to the commutator means; conductor means, operatively connected to the brush means, for conducting electricity; end shield means having bearing receiving means operatively connected to the frame, for enclosing the machine; at least one freely aligning bearing means, operatively positioned in at least the end shield bearing receiving means, the bearing means having a set of predetermined conditions preset therein and held by the adhesive means; mounting flange means, operatively adhesively connected to the frame, for operatively connecting the machine to anyone of a plurality of applications, such as automotive applications.

Other aspects of the structured product motor which contributes to its improved performance and cost advantages when compared to prior motors include the following structural and functional features.

The structured product motor further comprises an open and a closed end, the open end having end shield positioning means and isolator mounting means operatively formed therein, the closed end having a plurality of cooling means operatively formed therein so that noise transmission therethrough is reduced.

The frame bearing means can have either a ball bearing or a sleeve bearing with retainers, operatively positioned in the frame bearing receiving means, for operatively interacting with the shaft, the sleeve bearing retainer being adhesively held in position in the bearing receiving means after the establishment of a predetermined set of conditions therebetween, the same predetermined set of conditions being repeatedly duplicated in a plurality of different sleeve bearing means in a plurality of different bearing receiving means despite dimensional variations in each different bearing, each different retainer and each different bearing receiving means.

The two magnet means additionally have, when assembled in the frame, gaps therebetween and are positioned in the frame so that noise, generated inside the frame and transmitted between the gaps toward the closed end of the frame, exiting the frame through the plurality of cooling means is significantly reduced.

The shaft is approximately precisely uniform and has a bearing surface at one end and an application connector means at the other, a plurality of laminations having slots, forming a core are inductively heated prior to being operatively positioned on the shaft.

A spacer is operatively positioned on the shaft between the bearing surface and the lamination core.

Insulating means are operatively, uniformly distributed over the lamination core, the spacer and at least a portion of the shaft.

The commutator comprises an inner insulating core portion and an outer electrical conduction portion, preferably made of copper, having slots and tangs, the commutator being operatively adhesively bonded to an uninsulated portion of the shaft between the bearing surface end and the lamination core.

Conducting means, such as magnet wire, is operatively wound in the lamination slots and is operatively connected to the commutator tangs.

Each oil slinger comprises a cup shaped portion for slinging oil back into the bearing means.

An end play compensation means is operatively positioned between the cup shaped portion of one oil slinger and the commutator, for adjusting the end variation of the shaft to within a predetermined range.

An axial vibration reduction means or thrust compensation system comprising at least one, preferably elastomeric, washer and at least one, preferably nylatron, washer, with one of the preferably elastomeric washers being operatively positioned adjacent the oil slinger most proximate the spacer and another preferably elastomeric washer being operatively positioned adjacent the oil slinger most proximate the commutator. The armature is preloaded or biased by positioning the magnet means, relative to the core, more proximate the closed end portion of the frame so that the interface between the bearing surface and at least one nylatron washer of the thrust compensation means will cause pressure on the adjacent bearing means. This preload results from the natural tendency of the magnets to axially center the lamination core so that the axial vibration/movement of the armature is significantly reduced.

Each brush is precisely formed with a bevel for contacting the commutator and each brush has an electrical connector means, such as copper pigtails, operatively connected thereto.

The brush plate assembly means include a plate and preferably has at least eight D-slots operatively formed therein and at least three isolator means operatively connected thereto.

At least two brush boxes are operatively connected to the brush plate preferably utilizing the D slots as connecting means for minimizing stress in the plate and for precisely positioning the brushes normal to the outer surface of the commutator.

A ribbon spring, operatively connected to each brush, urges each brush against the outer surface of the commutator at an approximately constant force per unit area of contact therebetween.

An electrical conductor means, such as a plug, is operatively connected to the brush connector means, such as a copper pig tail, for conducting power to and from the motor.

The end shield further comprises electrical conductor receiving means, corresponding to the electrical conductor positioning means of the open end of the frame, isolator retaining means, corresponding to the isolator mounting means in the open end of the frame, and bearing receiving means for receiving a freely aligning bearing means therein, the freely aligning means being adhesively held in position in the bearing receiving means after the establishment of a predetermined set of conditions therebetween, the same set of preconditions being repeatedly duplicated in a plurality of individual bearing means in a plurality of individual bearing receiving means despite dimensional variations in each individual bearing, each individual retainer and each individual bearing receiving means.

Each mounting flange comprises a mounting portion having a central aperture and a plurality of mounting means formed therein, and a cup shaped portion having an upper and a lower end and an inner and an outer surface, operatively connected to the central aperture at its lower end, the radius of the upper end being greater than the radius of the lower end, the surface of the cup shaped portion between the upper and the lower end gradually decreasing from a maximum at the upper end radius to a minimum at the lower end radius, the upper end portion having a lip portion so that when any one flange is operatively positioned on the frame, the cup shaped portion forms a reservoir for receiving an adhesive, for interacting with an adhesive activator applied to the inner surface of the cup shaped portion and/or the outer surface of the frame whereby the flange and the frame are adhesively bonded together.

The specific illustrated structured product motor developed for a specific automobile model includes: two frames differing only in axial length; three different magnets, two having the same tapered end and differing only in axial length and the other magnet having no taper; a plurality of different shafts each differing in its application end with some differing in length and others differing in diameter; a single lamination utilized in two different stacks to form a core; two different commutators, a single preferred brush card assembly plate having two different brush boxes mounted thereon and two different brushes, one for each different brush box; a ribbon spring mounted in each brush box for urging each brush toward the commutator selected from two different springs according to the end application; two bearing systems, one freely aligning sleeve bearing system utilized in both the frame and the end shield and one ball bearing system utilized in the frame only, a single spacer operatively connected to the shaft; one isolator means for interconnecting the brush plate assembly with the frame; one oil slinger mounted on each end of the shaft, one proximate the spacer and the other proximate the commutator, in one application only the oil slinger approximate the commutator is utilized a single end shield for all applications; one of two possible plugs selected according to the end application and a mounting flange for each application.

Other aspects of the present invention include methods for: adhesively connecting the magnets to the frame, adhesively connecting the commutator to the shaft, adhesively positioning and establishing a predetermined condition in a freely aligning bearing means in both the end shield and the frame, and adhesively connecting the mounting flange to the motor frame.

Accordingly, objects of the present invention include: to provide a structured motor comprising a maximum number of common, cost optimized, motor subcomponents combined to accomplish the maximum number of applications including automotive applications; to provide a motor having minimum tooling cost; to provide a motor having minimum manufacturing costs; to provide a motor which generates a minimum amount of noise; to provide a motor having reduced reluctance torque; to provide a motor having at least one freely aligning bearing system; to provide a motor having relatively constant contact pressure between the brush and the commutator surface throughout the life of the brush; to provide a motor having a one piece formed frame which includes one bearing socket; to provide a motor having oil slingers which form part of the armature assembly; to provide a motor having a single computer optimized lamination design for a plurality of different applications; to provide a motor having laminations forming the core secured to the shaft by an inductive heating process; to provide a motor having the armature balanced prior to the commutator being final finished; to provide a motor having a brush plate assembly which generates less noise than prior known motors for automotive applications; to provide a motor having the brush boxes precisely located on the brush plate so that the interaction between the brush and the commutator generates less noise than prior motors for automotive applications; to provide a motor having extended brush life; to provide a motor having reduced brush lock-ups in the brush box; to provide a motor having a brush that does not catch in the commutator slots; to provide a motor having a brush which rapidly seats on the commutator; to provide a motor having a freely aligning bearing means with predetermined conditions preset therein; to provide a motor having a freely aligning bearing means having predetermined conditions which are repeatedly duplicated in a plurality of individual components despite dimensional variations in the various individual components making up the bearing means; to provide a motor having improved bearing life; and to provide a motor which has a plurality of mounting flanges adhesively bondable for a plurality of different applications.

Other objects and advantages of the invention will be apparent from the following description, the accompanying drawings and the appended claims.

BRIEF DESCRIPTION OF THE DRAWINGS

FIG. 3A is a sectional view of the magnet utilized for air conditioning applications in the motor of FIG. 1;

FIG. 3B is a cross sectional view of the magnet utilized for engine cooling fan applications in the motor of FIG. 1;

FIG. 3C is a cross sectional view of the magnet utilized for heater applications in the motor of FIG. 1;

FIG. 4A is a sectional view of a partially constructed armature of the motor of FIG. 1;

FIG. 4B is an end view taken along line A—A of FIG. 4A;

FIG. 5 is a plan view of the laminations utilized in the motor of FIG. 1;

FIG. 6 is sectional view of the cup shaped portion of the oil slingers utilized in the motor of FIG. 1;

FIG. 7 is a plan view of the brush card assembly plate of the motor of FIG. 1;

FIG. 8A is a partial plan view of the brush box showing the ribbon spring in position in the brush box of the motor of FIG. 1;

FIG. 8B is an end view of the brush box of the motor of FIG. 1;

FIG. 9A is a plan view of a representative brush utilized in the motor of FIG. 1;

FIG. 9B is a side view of the brush of FIG. 9A;

FIG. 10A is a plan view of the inside portion of the end shield of the motor of FIG. 1;

FIG. 10B is a sectional view taken along line 10B—10B of FIG. 10A;

FIG. 11A is a plan view of the freely aligning bearing system of the motor of FIG. 1;

FIG. 11B is a section view of the freely aligning bearing system of FIG. 11A taken along line 11B—11B;

FIG. 12A is a side view with an alternate mounting flange in section of the motor of FIG. 1; and FIG. 12B is an end view of the motor of FIG. 12A taken along line 12B—12B with portions cut away for clarity.

DESCRIPTION OF THE PREFERRED EMBODIMENT

Combination Summary

Figure 1:
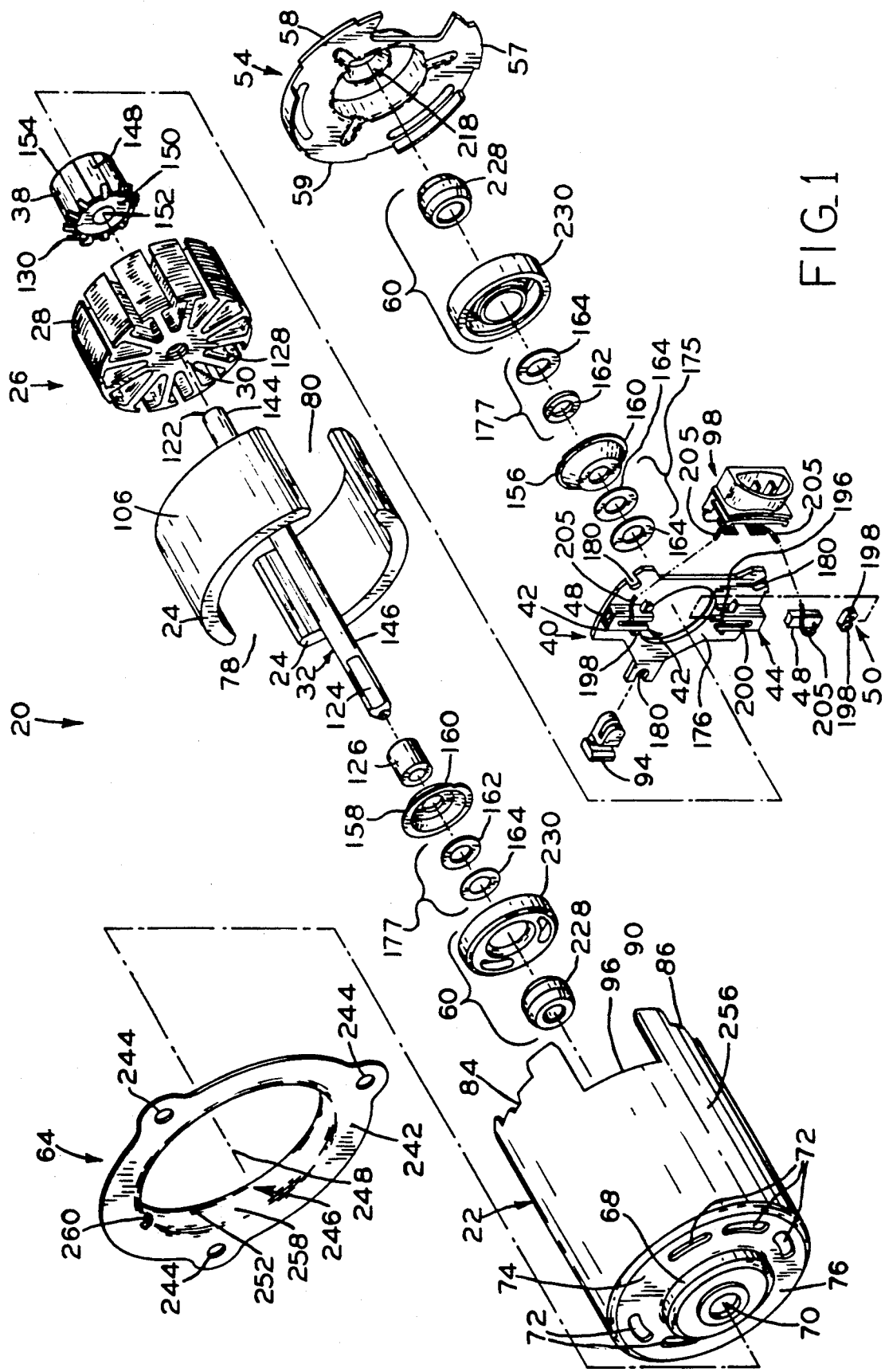
FIG. 1 is a exploded perspective view of a structured product motor that embodies the present invention in one form thereof.

One embodiment of the motor of the present invention illustrated as a structured product permanent magnet motor for a plurality of automotive applications, generally designated as 20, is illustrated in FIGS. 1-12B. This specific motor 20 comprises a frame 22 having at least two application specific permanent magnet means 24 operatively positioned therein for functioning as the stator component of the motor 20; an armature means 26 (FIGS. 4A and 4B) having a core 28 of specifically designed laminations 30 which, in combination with the magnet means 24, provides a low reluctance torque, operatively connected to a precision formed shaft means 32 by a heat induction process; a specifically designed commutator means 38 operatively positioned on the shaft 32; brush plate assembly means 40 for isolating vibrations from the frame 22 and for aligning brush boxes 42, 44 on the plate means 40 in such a way that the motor has improved durability and reduced noise. The brush plate assembly 40 includes brush means 48 which are operatively positioned in the brush boxes 42, 44, the brushes being urged against the commutator means 38 by ribbon spring means 50; a stiffened end shield 54 for enclosing the armature means 26 within the frame 22 and for raising the natural frequency of vibration produced by the motor 20; at least one freely aligning bearing means 60 operatively positioned in the end shield 54 and optionally in the frame 22 for aligning the shaft 32; and a plurality of specific application mounting flanges 64, 64' each operatively adhesively connected to the frame for positioning the motor 20 for each different application, some of the mounting flanges having stiffening ribs 66 (FIG. 12B) for reducing vibrations by raising the low natural frequency up so that motor structure noise is significantly reduced.

Frame

As shown in FIGS. 1, 2A, 2B, 12A and 12B the cup-shaped frame 22 of the unitary or illustrated embodiment is generally cylindrical in configuration and houses permanent magnets 24 which are preferably of curved, rectangular configuration.

The closed end portion of the frame 22 has a protuberance 68 with an aperture 70 formed therein for receiving the shaft 32. This protuberance 68 has a bearing socket 71 which receives freely aligning bearing means 60, (FIG. 2A), utilizing a sleeve type bearing for heating and air conditioning applications and preferably a ball type bearing means 60' for engine cooling applications (FIG. 2A), the details of the bearing means 60, 60' will be discussed below.

A plurality of cooling apertures 72 (FIG. 1) are formed in the closed end portion of the frame adjacent protuberance 68 for motor cooling purposes. In order to achieve improved noise reduction, cooling apertures are omitted in the end of the frame adjacent protuberance 68 in the areas 74, 76 roughly corresponding to the gaps 78,80 between the permanent magnets 24 because it has been determined that noise has a tendency to travel down the gaps 78, 80 between the magnets 24 and out through any cooling apertures 72 which might be positioned corresponding to the gaps 78, 80.

In an effort to minimize the number of separate components of the illustrated embodiment, the gaps 78, 80 between the magnet and the area 74, 76 do not correspond exactly in any of the specific illustrated motor embodiments. This is due to the different locations of the magnets with reference to their position within the frame due to the different direction of turning or rotation of the shaft relative to the frame. Thus, there is, although ideally not preferred, in practical application, a small portion of one of the apertures 72 which overlaps the gaps 78, 80.

The frame 22 also has an aperture 82 (FIG. 2A) positioned therein for the reception of a conduit (not shown) which will allow cooling air to be drawn through the inner portion of the cup shaped frame and over the armature means 26. The aperture 82 works in conjunction with the frame cooling apertures 72 to facilitate the flow of cooling air within the illustrated motor 20.

The location of the aperture 82 (FIG. 2A) relative to the brush plate assembly 40 is important and is selected so that air entering the aperture 82 is directed to flow over the brush boxes and brushes contained therein thereby somewhat cooling those components.

A plurality of end shield positioning means and isolator mounting means, such as for instance cutouts 84, 86, 88 are formed in the open end 90 of the frame 22 for receiving a plurality of, preferably resilient, isolator means or garments 94 for operatively connecting the brush plate assembly means 40 to the frame 22. An additional rectangular shaped cutout 96 is formed between two of the brush plate assembly isolator receiving cutouts 84,86 for receiving an electrical connector or plug 98 therein.

As with any real-life project, the application which led to the development of the illustrated motor involved certain physical constraints. Specifically with regard to the frame, the area available to house the motors for the various applications constrained the motor diameter to no more than approximately 76 millimeters. This constraint in overall outer motor diameter established the initial motor design parameters.

As is well-known, the frame is required to carry the magnetic flux and is sized so the frame is at the edge of the saturation per minimum thickness so that the frame can carry the needed amount of flux but without excessive material being contained therein. Thus, given the diameter constraint of the illustrated motor, the thickness of the frame and the length of the frame, length being defined as the distance between the air gaps cooling aperture 72 and the portion of the conductor receiving means 96 most approximate to those cooling apertures, the product thereof must be sufficient to carry the necessary magnetic flux for the overall system.

In the illustrated motor, the frame was sized as small as possible to fit within the space available and at the same time to have the minimum amount of material contained therein effective to carry the required magnetic flux.

In the illustrated motor, given the three distinct applications, two frames differing only in length were required to meet both the space available and the magnetic flux requirements.

Magnets

Figure 2A:
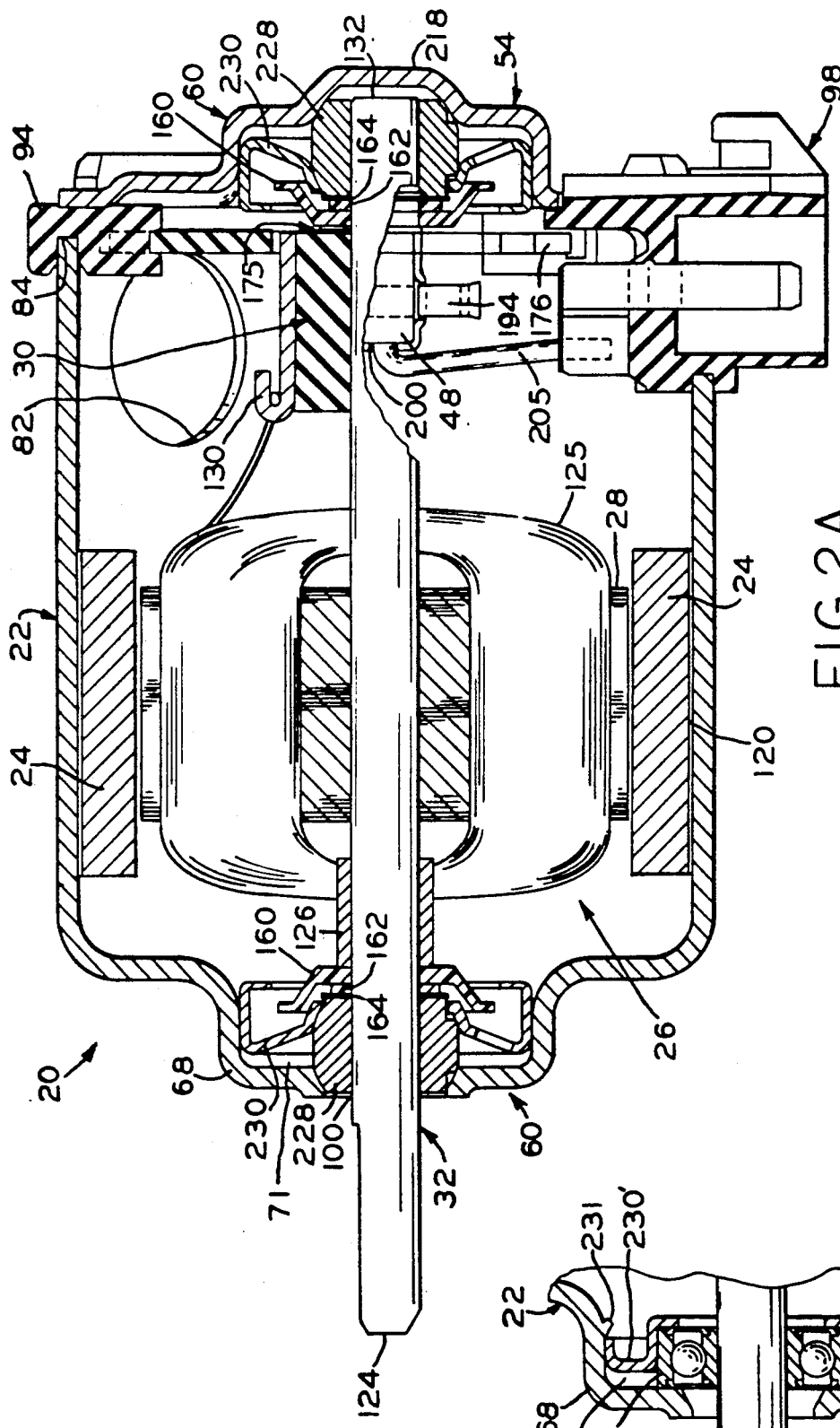
FIG. 2A is a sectional view with portions cut away of the motor of FIG. 1.

As shown in FIGS. 1, 2A, and 3A–3C, the magnets 24 utilized with the illustrated motor are made of conventional magnetic material. The magnets 24 (FIG. 1) have a general arcuate shape which conforms generally with the inner surface 120 of the frame 22 (FIG. 2A). Each magnet 24 comprises a middle portion 100, two end portions 102,104, an outer surface 106 and an inner surface 108. The outer surface 106 which contacts the inner surface 120 of the frame 22 (FIG. 2A) of each of the magnets shown in FIGS. 3A, 3B, and 3C, is formulated according to the tri-arc method. This known method of fabricating permanent magnets which are attached to the frame wall comprises using two different circle radii to insure that there are at least two points of contact between the magnet and the frame wall. In the magnets utilized in the illustrated embodiment, it is preferred that the points of contact be spaced apart approximately ninety (90) degrees and that each one be approximately forty-five (45) degrees from the center line of the magnet. These points would roughly correspond to locations 110, 112 in FIGS. 3A, 3B, and 3C.

The magnet frame contact points 110, 112, as is well known, will vary slightly due to variations in the frame and magnet curvatures. This tri-arc technique is utilized to prevent the rocking of the magnet relative to the frame. As is known, stability of the magnet, after placement of the magnet on the frame, with relation to the armature core is critical to insure a constant air gap between the core 28 or the outer surfaces of the laminations 30 and the inner surface 108 of the magnets 24. A consistent air gap between the magnets and the laminations of the armature core is important because reluctance torque is sensitive to the net air gap between the magnet 24 and the core 28 of the armature 26, net air gap being defined as the distance between the inner surface 108 of the magnet 24 and the outer surface of the core 28. Cogging or reluctance torque is defined as the torque required to turn the armature or the torque pulsations to turn the armature 26 when the illustrated motor 20 is unenergized.

For the air conditioning and the heater fan applications as shown in FIGS. 3A and 3C, the inner surface 108 of the magnet is thicker at the center portion 100 and tapers off to the ends 102, 104. This taper effect is the result of the inner radius corresponding to the inner surface 108 of the magnet being determined from a different focus point 113 then the focus point 114 used to determine the outer radius corresponding to the outer surface 106 of the magnet as well as the use of different radii at points 113, 114. The resultant distance between points 107, 115 is greater than the distance between point 116, on the outer surface 106 and point 117 on the inner surface 108. In general, the thickness of the magnets, as shown in FIGS. 3A, 3C, is greatest between points 107, 115 and gradually decreases in either direction from the center 100 of the magnet to the tips 102, 104.

The gradual decrease in magnet thickness from the center 100 toward each tip 102, 104 reduces the cogging or reluctance torque of the motors having these magnets operatively positioned therein because the air gap or the distance between the magnets inner diameter and the armature coil outer diameter will increase as you move away from the center 100 of the magnet 24, thereby allowing the energy in the air gap to approach more closely a more constant value as the armature 26 is rotated. Specifically, the taper provides for a gradual change in flux as the air gap is approached.

The magnet for the engine cooling application, as shown in FIG. 3B, due to the consistent distance between the outer surface 106 and inner surface 108 has a some what higher reluctance torque so that there is more flux in the illustrated motor resulting in more efficient motor operation. In this embodiment, additional reluctance torque is desirable so that the armature 26 does not move as readily when unenergized or as a result of air moving through the radiator (not shown) and through the fan (not shown) connected to the illustrated motor 20. If the air moving through the radiator and fan were to cause the fan to rotate or windmill, oil would be pumped out of the bearing 60 (FIG. 1) proximate the end shield 54 possibly causing the bearing to fail prematurely. Additionally, as opposed to the heating or air conditioning application, noise caused by vibration resulting from a torque ripple related to the reluctance torque is not as critical because of the other audible noise under the hood of an automobile.

The magnets 24 of the illustrated embodiment, working with other components, such as the frame, of the illustrated motor were optimized for performance as a function of cost, size, and weight of the motor. Some of the performance specifications of the illustrated motor impacting upon the magnet design were: motor shaft torque at a specific speed or rpm; cogging or reluctance torque; upon starting the motor, the current required to demagnetize the magnets at a given temperature (the given temperature for the illustrated motor is at or below minus forty (−40) degrees C. with 5% or less demagnetization); maximizing motor efficiency for all applications at the specified ranges for: ambient temperature; output power; input voltage; etc.; motor size/volume; motor weight; motor noise; durability (bearings, brushes, etc.); and longevity, among other factors.

Other parameters of the magnets which are varied to reach the optimal cost, weight, and volume versus performance include: outer radius as a function of the angular magnet span, radial magnet thickness as a function of the angular span, axial length, angular span, choice of material composition of magnet, radial air gap as a function of the angular span, and radii at the edge as the magnet tapers. The cost of the magnets can be mathematically expressed as a continuous function of the physical parameters which are then used to predict magnet performance. These various parameters, which are all interrelated and interdependent upon each other, are optimized in order to optimize the magnet performance versus cost.

The magnets 24 are adhesively bonded to the frame 22 according to the following method. First, the outer surface 106 of the magnet 24 which is going to contact the frame 22 and the frame inner surface 120 which will be in contact with the magnet's outer surface have dust, oil and grease removed therefrom. After the relevant parts are cleaned, an adhesive activator, such as preferred Dymax activator 535 available from Dymax of Torrington, Conn., is applied to the inner surface 120 of the frame 22 which will be in contact with the magnets and the solvents are allowed to evaporate therefrom. Two beads (one bead may suffice) of adhesive, such as preferably Dymax 20012 revision A, are applied to the magnet outer surface 106 at which time the magnets and the frame are brought into contact and the adhesive is spread and mixed with the activator. The assembled parts are clamped together for approximately 60 seconds in order to obtain fixturing strength. The magnets assembled according to this method should have adhesive which covers a minimum of 85 percent of the magnet outer surface area.

Armature

As shown in FIGS. 1, 2A and 4–6, the armature means 26 utilized with the illustrated motor 20 comprises: one of a plurality of relatively uniform, precisely formed shaft means 32 having one end 122 for mounting in the end shield bearing means 60 and having the other end 124 modified according to the specific application to which the motor is operatively connected, such as a blower means for a radiator, air conditioner or heater; a specific number of stacked, inductively heated laminations 30 forming a core 28 operatively positioned on the shaft 32; a spacer 126 operatively positioned on the shaft 32 proximate the application end 124 and a commutator means 38 operatively positioned on the shaft 32 proximate the end shield end 122 thereof; winding means, such as magnet wire 125 wound through the various lamin slots and connected to the commutator means 38 by a plurality of tangs 130; and an insulating coat of an epoxy resin 132 (FIG. 4) applied to the laminations 30, shaft 32 and spacer 126 by an electrostatic fluidized bed coating process (not shown).

Presently, the preferred material for the spacer, nylon 46 has the advantage of surviving the heat of the epoxy coater utilized to apply the insulation layer.

LAMINATIONS

As shown in FIGS. 1, 4 and 5, each lamination 30 comprises a yoke portion 133 and a plurality of lamination teeth 134 having a width $T_1$. Each lamination tooth 134 includes a rectangular portion 136 and a T portion 138 on the outer periphery of the lamination. Each lamination tooth T portion 138, has symmetrical tips or portions 140, 142. Each tip portion has a width 143. The slots 128 are formed between two adjacent teeth 134.

The illustrated lamination 30 has the same number of lamination teeth 134 as lamination slots 128. The lamination slots have a width 129 between tip portions 140, 142 which provide for the introduction of magnet wire into each slot 128. In the illustrated lamination, there are preferably twelve (12) lamination slots and teeth.

The parameters of the lamination design which are varied along with other parameters of the illustrated motor to reach an optimal combination involving the lamination and the magnet design etc., are: angular width of the tooth slot opening 129, radial width of the tooth tip 143, angular span of the tooth at the air gap 135, tooth width $T_1$, number of teeth (12 in this embodiment), slot area 145, radial depth of the back iron or yoke 133, outer diameter of the lamination 147, axial length of the core 28 (composed of more than one lamination), the magnet overhang or the axial length difference between the magnet and the core, (FIG. 2A) the inner diameter of the lamination or shaft diameter, lamination material, and lamination thickness 31.

The above mentioned parameters are dependent upon various factors, however, the most basic factor is the amount of flux required and the amount of flux that the lamination steel will carry. It is commonly known that steel will carry a certain amount of flux density until it saturates. At that point, the steel will carry additional flux only with a greatly disproportionate increase in magnetic force than was applied at lower flux levels there is a trade-off between the slot area 145 versus the amount of available steel, the tooth width $T_1$ and the yoke 133. One important limiting factor relating to the size of the slot 128 is the optimization of the slots area 145 for housing the magnet wire verses just barely saturating the steel. The goal is to minimize the tooth width while maximizing the wire housing area 145 and while maximizing the amount of flux that the steel can carry.

The outer diameter of the lamination 147 plays a role in lamination optimization in that it effects the amount of flux that is possible since the magnitude of the flux is a function of the diameter of the lamination and the diameter of the motor. Basically if the flux is as close to saturation as possible or only a little over, there must be sufficient area in the wire housing area 145 for the magnet wire. These factors establish the dimensions of the lamination which then establish the values of the other parameters. All of the above factors are optimized to minimize the cost and the volume with respect to the outer diameter of the motor.

With respect to cogging or reluctance torque, the angular width of the tooth slot opening 129 is important in that it should be minimized while allowing sufficient space for physically winding the magnet wire into the slots 128. The smaller the slot width 129 the less the reluctance torque. The tip thickness 143 is also important because as it is increased, reluctance torque is reduced.

In selecting the lamination thickness 31, it is desirable to have a minimum number of laminations because thicker steel is less expensive. However, the thicker the steel the greater the magnitude of the induced eddy currents. In the illustrated embodiment the lamination thickness was optimized as an intermediate between current considerations and steel cost considerations.

As with the cost of the magnets, the cost of the lamination can also be mathematically expressed as a continuous function of the physical parameters which are then used to predict lamination performance. These parameters are all interrelated and dependent upon one another.

In order to assemble the core 28 on the shaft 32, the laminations 30 are first stacked, forming the core 28, inductively heated, placed on the shaft 32 and then cooled so that they are connected to the shaft 32 without being distorted as is sometimes caused by press fitting.

The specific method for connecting the core 28 comprising a plurality of laminations 30 to the shaft 32 of the illustrated motor 20 is as follows. The specific number of laminations, such as 37, used in one application, are randomized and realigned. Each of the laminations 30 will have the slot burrs facing the same direction. End lamination burrs are removed by a brushing operation. An inverted end lamination is placed on the stack so that the slot burrs and the shaft hole burrs face inward. The stack height of loose laminations will be measured with a 20 pound axial force applied to the laminations. The weight may be increased if an axial density of at least approximately 0.535 pounds per inch results from its applications. The stacked and aligned laminations are now heated to a temperature which will allow the shaft 28 to clip fit into the laminations stack, preferably a temperature between 900 degrees F. but not to exceed approximately 1,200 degrees F. unless an inert atmosphere is used in which case the temperature should be exceed approximately 1,200 degrees F. As the shaft 32 is being inserted, the laminations 30 are pressed together with sufficient force so that the axial density of the core exceeds approximately 0.35 pounds per inch. This force, while sufficient to create that density, must not cause the laminations to spread apart at the outside diameter of the stack. The outside diameter gap, due to lamination bow, should not exceed 0.18 millimeters. During this process, the laminations 30 are held together until they are tight on the shaft 32.

The shaft 32 is inserted into the lamination core 28, preferably commutator end 122 first, and must not stick during the insertion. After insertion, the laminations 32 should be air cooled and the end lamination must withstand approximately 0.53 newtons—meter or 75 oz.—inches of torque without turning. After the assembly, the shaft bearing journals 144, 146 will be checked for marring, and the shaft 32 will be checked for straightness. The assembled core should be able to withstand ten times the stall torque of the motor which is approximately 2,000 oz—in for air conditioning motors.

Magnet wire 125 is operatively wound in the slots 128 and operatively connected to the tangs 130 such as by fusing. After assembly and commutator rough finish operation, the armature assembly 26 is balanced by adding precise amounts of an epoxy (not shown) to the winding at precise positions and then the commutator is final finished. This sequence of steps provides for the precision balancing of the armature means 26 which goes well beyond the levels of balance commutator roundness achieved in prior motors used in automotive applications.

One of the key elements of the motor of the illustrated embodiment is the reduction of the reluctance torque or the torque required to rotate a steel structure inside of a magnetic field, in this case, permanent magnets. The higher the reluctance torque, the greater the noise generated by structural vibration. The motor of the present invention has very low levels of reluctance torque and this results from the combination of frame, magnet and lamination design optimization, as mentioned earlier.

Commutator

As shown in FIGS. 1, 4A, and 4B, the commutator means 38 comprises one continuous copper ring or outer electrical conduction portion 148 which is rolled around an insulator or inner insulating portion 150 and then cut to size. The insulator 50 preferably comprises a phenolic material having an aperture or bore 152 formed therein for receiving the shaft 32. Tangs (not shown) are operative to hold the copper ring 148, having a plurality of slots 154, stationary on the insulator 150. The commutator means 38 is adhesively connected to the shaft 32 by applying the adhesive activator to the bore 152 surface in the insulator 150. Adhesive is then applied to the shaft 32 and the commutator means 38 is operatively positioned thereon. The adhesive bond is important in order to avoid possible commutator or shaft distortion which might result from conventionally press fitting the commutator to the shaft.

It is important to maintain the dimension tolerance for both the shaft 32 and the commutator bore 152 in a well defined range in order to properly position the commutator 38 on the shaft 32.

When assembled on the shaft 32, the commutators twelve (12) slots 154 and the laminations twelve (12) slots 128 which carry the magnet wire forming the coil, must, in order to function properly, be precisely aligned relative to each other (FIG. 4B). This alignment is accomplished by a means for positioning the commutator 38 on the shaft 32 in such a position that the commutator slots 154 are properly positioned relative to each lamination teeth center line 137 by mechanically coordinating the relative positions of the commutator slots 154 to the lamination teeth prior to the setting of the adhesive which secures the commutator on the shaft.

Since it is important that the commutator 38 be securely and precisely located on the shaft 32, the commutator means 38 utilized in the illustrated motor is adhesively connected to the shaft 32 according to the following method. First, it is important to make sure that the commutator bore 152 which will be contacting the shaft and the shaft itself are free of dust, oil and grease. Next, an adhesive activator such as preferably Dymax activator 535, is applied to the commutator bore 152 and the solvents are allowed to evaporate. The commutator is assembled part way onto the shaft so that adhesive will be spread the full length of the commutator 38, but not spread beyond the commutator in the area of an oil slinger 156 and bearing journal 144. An adhesive such as preferably Dymax 328 VLV is applied to the chamfer on the tang end of the commutator. The commutator and the shaft are rotated approximately 90 degrees in order to mix the activator and the adhesive and allowed to set for approximately one minute minimum. Thereafter, the parts are placed under ultraviolet light for a minimum of two minutes in order to cure the adhesive bond between the commutator and the shaft.

Oil Slingers

As shown in FIGS. 1 and 6, the oil slingers 156, 158 of the illustrated motor 20, which previously have been part of the bearing system in conventional automotive DC motors, are part of the armature means 26. Each oil slinger 156, 158 comprises a cup shaped member 160. The oil slingers 156, 158 are operatively positioned on the shaft proximate the spacer 126 and the commutator means 38 respectively. The cup shaped member 160 has a base member 166 having a bore 168 formed therein and a circular portion 170 having a greater diameter at its outer portions 172 and a lip portion 174.

The oil slingers 156, 158 are positioned in the illustrated motor so that when oil leaks from the bearing, it is directed into the cup shaped member 160, which is rotating with the shaft 32, and is propelled back into the bearing 60. This increases the bearing life which when combined with the advantages of a freely aligning bearing reduce noise and greatly extend the motor life.

Prior to the positioning of oil slinger 156 on the shaft 32, an end play compensation means 175 is positioned on the shaft 32. The end play compensation means 175 adjusts the play in the shaft to a predetermined tolerance thereby properly positioning the application end 124 of the shaft.

Thrust Compensation Means

An axial vibration reduction which comprises in part a thrust compensation means, 177, comprising a first washer means 162, preferably an elastomeric or rubber washer, and a second washer means 164, preferably a nylatron washer is utilized to counter a preload force on the frame bearing in socket 71 which is due to the greater magnet overhang or distance between the end of the core 28 and the end of the magnet 24, as shown in FIG. 2A, and that portion of the magnets and core most proximate the shaft end 124. The amount of magnet overhang is different for each of the three applications illustrated.

The thrust compensation means 177 is utilized to maintain the preload or biased initial position of the armature relative to the magnets. The natural tendency of the armature to be more toward one end, due to the magnet preload, is utilized to maintain pressure on the bearing system 60 proximate the application end 124 of the frame 22. This initial bias induced pressure severely restricts axial movement of the armature between the two bearing means and thus reduces noise which usually results from armature axial movement.

Specifically, the intentional preload attempts to maintain a single brush/commutator track throughout the life of the motor.

The axial position of the magnets 24 in the frame relative to the core 28 determines the magnitude of the biasing force on the frame bearing which axially stabilizes the armature between the two bearing means.

In order to minimize noise related to the interaction of the nylatron washer 164 and the sleeve bearing 228, the surface of the bearing 228 in direct contact with the washer 164 is bevelled, preferably four (4) degrees, so that any noise generated thereby is reduced at the bearing washer interface due to contact slippage between the bearing and the washer during shaft rotation. Under heavy axial load the thrust washers conform to the bearing surface to maintain a constant pressure.

Brush Plate Assembly

As shown in FIGS. 1, 2 and 7-9B, the brush plate assembly means utilized with the illustrated motor 20 comprises a brush plate 176 preferably made of generally D-shaped slots or insulating material such as plastic or preferably laminated phenolic having a plurality of D-slots 178 precisely formed therein and at least three isolator attachment means 180 for receiving isolators 94 which are operatively connected to the frame 22. At least two brush boxes 42, 44 are operatively connected to the brush plate 176 via the plurality of D-slots 178. A pair of brushes 48 are inserted into the brush boxes and are each urged toward the commutator means 38 by a ribbon spring 50. A connecting means or copper wire (pigtail) 205 connects each brush 48 to the electrical conducting means or plug 98.

In the presently preferred embodiment of the brush plate assembly 40 of the illustrated motor 20, the brush boxes 42, 44 are basically rectangular in shape having two sides 182, 184 and a top surface 186. While, as shown, the brush plate 176 serves as the bottom surface of each box 42, 44, it is anticipated that each box 42, 44 could have its own integral bottom portion.

Because the relative location between the brushes 48 and the commutator ring 148 is critical to noise reduction and the smooth and efficient operation of the motor itself, the positioning of the brush boxes 42, 44 on the plate 176 takes on an added importance. Since the brushes can rattle, move around or become hung up in the box, thereby generating increased noise or resulting in motor malfunctions, the assembly and positioning of the brush boxes 42, 44 on the plate 176 is critical.

As shown in FIGS. 7, 8, and 8B, the brush boxes precisely dimensioned and preferably have at least four (4) members or tapered tabs 188 for insertion into the precisely positioned D-slots 178 on the plate 176. The members 188 are then positioned on the plate 176 by holding the brush box 42, 44 in a predetermined position in such a way that the members 188 first bend over the straight portion 190 of the D-slot and then are crimped without applying stresses on the plate 176 itself. Specifically, the portions of the member 188 most proximate the plate 176 are not in frictional contact therewith because during the crimping process, means are inserted between the tips and the plate surface for preventing direct contact between the plate 176 and the members tip 192 such that surface frictional contact between the members 188 and the plate 176 is not made. Additionally, during the crimping process, means are inserted into the brush box to maintain the dimensional integrity of the box while the members 188 are being crimped. This prevents the pulling of the box further down into the plate 176 preventing the distortion of the axial length of the box at either end and keeps the boxes aligned with each other.

The plurality (preferably four) of members 188 for inserting through the D-slots 178 on the brush plate 176 extend from the bottom of the two sides 168, 184. These members 188 are effectively connected to the plate 176 in order to accurately position the brush boxes on the plate 176 without stressing the plate 176. This is accomplished by the tapered shape of the members 188 in that the tips 192 of the members 188 are more narrow than the upper portion 193 which is more proximate the walls 182, 184. Therefore, when the members 188 are inserted into the D-slots 178, the tips 192 pass through without penetrating or contacting the plate 176 but when finally positioned, at least a portion of the entire tapered portion does contact the bottom surface or opposite face of the plate 176 and at least partially penetrates the top surface or opposite face of the plate 176.

The above provides for the precise location of each brush box 42, 44 on the plate 176 without stressing the plate 176 due to the subsequent crimping of the members 188 so that there is minimal, if any, frictional contact between the surfaces of the members closest the bottom surface of the plate and the bottom surface of the plate. In other words, the members 188 are crimped in a manner to accurately, precisely, locate the brush boxes 42, 44 on the plate 176 without applying forces in excess of those required to maintain the brush box position while at the same time maintaining the internal dimensions of the brush box so that the brush will neither rattle excessively due to a loose fit thereof or hang up due to a tight fit therein.

Extending at approximately a 90 degree angle from the two sides of each brush box are extensions 194 which are cutout portions of the brush box sides 182, 184 rolled back leaving a pair of slots 196 for locating and supporting the coils 198 of the ribbon spring means 50.

While not shown, it is anticipated that other locating means such as an extension or a post on the plate for receiving the ribbon coils 198 could be utilized to position the ribbon springs on the plate.

A slot 200 is formed in the top wall of each brush box 42, 44 for receiving the connecting means 180 for each brush means 48 which is then connected to the conducting means 98.

As can be seen in FIG. 8B, in order to minimize debris, such as carbon dust from building up in the brush box in the areas adjacent to the brush box or between the brush and the brush box, the brush box utilized in the motor has neither a front or a back wall. Additionally, the side walls of the brush box have middle sections 202, 204 roughly corresponding to the extensions 194 which provide passageways on both sides of the brush when assembled into the brush box. These passageways provide space to receive the ribbon spring and, when combined with the open rear section of the box brush, provide for the elimination of excessive carbon build up or other residue which might interfere with the operable movement of the brush within the brush box. Perhaps more importantly, the sections 202, 204 stiffen each box to minimize vibration and thereby minimize noise.

The junctures of the left 184 and right wall 182 of each brush box with the top wall 186 are of such precision dimension that the brush 48 is held in a relatively fixed position relative to the commutator 38. Also, once the members 188 of the left 184 and right 182 side walls are properly positioned within the D-slots 178, clearance is provided between the brush box sides and the brush so that the brush can move freely within the brush box while retaining a rather precise position relative to the commutator.

As with various other components of the motor of the present invention, various parameters can be varied to reach an optimal combination and sub-combination. In the case of the brush plate assembly, the radial length of the brush box, axial clearance with the brush, angular clearance with the brush, radial tilt of the brush box (leading or trailing design), distance from the commutator side of the box to the core, length of the brush box as compared to the brush, plate and box materials and thickness, boxed plate mounting technique, box to shunt clearance, brush key transfer (box orientation and location), sizing for correct electrical load (amps/square inch), isolator materials, durometer and location for vibration isolation and breast plate location, and brush axis relative to the magnet axis) brush shift are among the dimensions and parameters which were considered to arrive at the specific design of the motor of the present invention.

If each brush box were to be integrally formed with the brush plate, there would be passageways formed therein similar to those of the separate brush box illustrated. It is believed that such a new brush box, without the extensions 194, and having four sides, such that bottom wall would not be the plate 176, would provide a more tightly or better dimension control of the box when the design illustrated in figures 8A and 8B. The spring rather than fitting in the slot would be retained in place by posts on the plate itself.

In the illustrated brush box, it is important that the heat which is generated by the interaction of the brush and the commutator be radiated so that it can be transmitted into adjacent areas thereto or into ambient space. Because plastic is a heat insulator, metal is presently the preferred brush box material. However, any material which would provide the necessary precise sizing and allow for heat radiation and dissipation would be acceptable.

Brush

FIGS. 1, 2, 9A and 9B show the brush means 48 of the illustrated motor. The brush means 48 preferably comprises a copper graphite blend. The brush means 48 when inserted into each brush box 42, 44 are each operatively urged out of each brush box 42, 44 by the ribbon spring means 50 which provides a nearly constant tension/force on each brush 48 against the commutator means 38 throughout the life of each brush. This constant force is believed due to the curvature of the ribbon spring coils 198.

The brush means, 48 are generally rectangular in shape. The commutator contact or engagement end 206 of the brush means 48 which perpendicularly contacts the commutator means 38 is bevelled and thus initially has one end portion 208 longer then the other portion 210. The bevel 212 is located on the back side so that moment of the force about the point of the isolator 94 is minimized, otherwise the plate 176 would tend to bow. The bevels of the opposing brushes are ground therein in opposite directions to provide smoother interaction between the brushes and the commutator and therefore generate less noise.

With the present brush design, one brush deposits residue on the commutator and the other brush scrapes it off or removes it from the commutator, thereby reducing noise generated by the commutator-brush interaction.

As shown in FIGS. 1, 9A and 9B, the conducting means or copper pigtail 205 is connected to the brush 48 such that when the brush is inserted into a brush box, the pigtail 205 fits in slot 200. The composition and size of the pigtail is selected to provide a very low resistance path so that it will not burn if it becomes over heated and will act as a heat transfer means for transferring excessive heat from the brushes to other areas where the heat can be better dissipated. Because the brushes get very hot from fictional forces and resistive loss and in order to prevent the brush box and the brush plate assembly as a whole from over heating, there is a need for a means for transferring this excess heat and the pigtails 205, in addition to conducting the current, conduct some heat away from those aforementioned motor portions.

Since the ribbon spring means 80 acts with a nearly constant force, in order to rapidly seat the brush means 48, the bevelled end portion 206, which initially contacts the commutator means 38, is slightly extended. This develops a very high initial pressure between the brush surface and the commutator surface over a relatively small area of the commutator/brush interface thus initially providing a very high force per unit surface area which establishes proper filming earlier. Since the prior practice for automotive application motors was to let mechanical wear seat the brushes onto the commutator, some brushes did not seat properly even after extended usage due to the variety of the load experience in the applications. This condition was verified by profilometry test of numerous brushes which revealed they wore-in with several different radii—the intrinsic shape, along with one or two radii worn-in during operation. These different radii were testament to the instability of the brushes and the potential brush noise associated with dynamic behavior.

In order to prevent the uneven wear-in and thus eliminate the potential for excessive brush noise, the brush 48 is ground to near exact dimensions of the commutator. This reduces the wear-in period and brush card vibration thereby resulting in a quieter motor.

Additionally, the brushes are specified to near net shape thereby minimizing process time after which the brush contour is ground to a line-contact configuration resulting in lower brush originating noise levels.

It is important to have a smooth surface on the brush that will initially contact the commutator. This insures proper wearing of the brush on the commutator. This is accomplished by grinding the end of the brush which contacts the commutator in order to capture the center line of the armature so that the brushes can move to the sides of the boxes based upon which direction that the grinding wheels turn which always turn in the same direction as the commutator turns for the particular motor being assembled.

The brush contour is such that the brush will now fit the commutator. Basically the brush is always ground with a radius slightly larger than the commutator so that there is contact with the commutator immediately in the center of the brush arc.

As shown in FIG. 9B the brush width is the width of the span of one the commutator segment or bar 148 (see FIG. 4B) plus the two adjacent commutator slots 154 on either side thereof. This is done to prevent the brush edge being the pressure point such that as a slight drop is experienced as the commutator rolls underneath it and then bounces when the brush edge hits the slot on the other side of the span and to provide for adequate time to complete the commutation event defined as the reversal of current within a coil which is being commutated by each brush at any given time. If the brush were to rock, this would create a vibration in the brush plate 76 which would generate noise.

Since the brush is composed of softer, more porous material than the commutator, the brush tends to compress and flow into the commutator slot. As long as the brush span relative to the commutator is equal to or preferably greater than the commutator span plus two commutator slots, the lateral stability of the other brush will be improved and will not tend to rock as much on the commutator.

Parameters of the brush which are varied in order to interact in a minimum cost maximum performance of the illustrated motor include: brush length, width, and depth, material and composition, shunt size, location, and stiffness, contour diameter and edge taper/bevel.

Since one of the primary objectives of the present invention is to reduce motor noise, and since noise is generated between the commutator tang and the brush plate assembly brush boxes, the distance between the commutator tang and the top of the brush boxes must be optimized so that fan cut-off type noise is minimized. This noise occurs whenever a tang passes by the brush box due to the air movement generated by the revolving tang hitting the box. In order to reduce this noise, the brush box is moved a sufficient distance away so that the noise generated by the tang rotation is either eliminated or significantly reduced but yet not so far away that additional motor length is added either to the motor or the commutator.

Additionally, durability of the brushes enters into the equation in that the radial clearance between the brush boxes themselves and the commutator is such that the brushes maintain freedom of movement within the box relative to the brush box but the movement of the brush back and forth relative to the commutator is minimized thereby minimizing the chances that the brush will hang up in the box by preventing the brush extending out of the brush box so far that a potentially excessive angle between the brush and the box is achieved.

End Shield

As shown in FIGS. 1, 2, 10A and 10B, the end shield 54 comprises a formed piece, preferably metallic, having a plurality of stiffening members 56, a plurality of connection members 57, 58, 59 for interfacing with the open end 90 of the frame 22, a cutout or mounting means 214 for receiving the conducting means 98 and a protuberance 216 for receiving a freely aligning bearing means 60. The end shield 54 is configured so that the connection members 57, 58, 59 mate with complimentary portions 84, 86, 88 of the frame 22 to complete the motor outer body shell. The end shield 34 is operatively connected to the frame 22 by preferably staking the members 217 at each end thereof (FIG. 12B).

One feature of the present invention is the choice of material used to form the end shield. Since once the bearing means 60 is properly located in the end shield bearing socket 218, it is desirable to minimize spring back, a relatively low carbon, low spring back material is utilized such as AISI 1010 AK DQ.

As shown in FIG. 10A, the bearing socket 218 is on the inside of the protuberance 216 and includes three lands 220, 224, 226 for interacting with a sleeve bearing 228 of the bearing means 60. These lands 220, 222, 224 and their importance to the freely aligning bearing means 60 will be discussed in detail below.

Bearing System

One key to the freely aligning bearing means 60 of the illustrated motor is the method and material used to assemble the bearing means 60 in both the frame bearing socket 71 and the end shield bearing socket 218.

As shown in FIGS. 1, 2A, 11A and 11B, the bearing means 60 used in the end shield 54 and in all but one application in the frame bearing socket 71 is a freely aligning bearing means versus a conventional self aligning bearing means. A freely aligning bearing is basically when the bearing 228 under very low forces will align itself to run in such a position that a basically good, uniform clearance is developed and maintained between the bearing journal on the shaft 32 and the bearing itself i.e. in such a position that the center line of the bearing aligns itself parallel to the shaft center line. Since it is desirable for the motor bearing systems to require very little force to align the bearings, the less force required to properly align the bearings, the more uniform the distribution is across the oil film across the shaft 32 because if the oil film is uniform, oil leakage from the bearing systems will be minimal given a specific force load. One advantage of the freely aligning bearing is that the lubrication leakage is greatly reduced thus increasing bearing life.

As stated above, one key difference between conventional self aligning bearing means and the freely aligning bearing means 60 used in the illustrated motor is the material used in the retainer 230. Conventionally, spring steel has been used, but the retainer 230 of the illustrated bearing means is very stiff and strong, preferably, for the particular motor illustrated, AISI 1010 AK DQ structural type steel which when formed provides a more uniform retainer shape and thus a repeatedly uniform bearing means 60.

Another key to the improved performance of the freely aligning bearing means 60 is the establishment of a set of known conditions in each bearing means 60 which is held in whatever position corresponds to those desired conditions. This is in contrast to prior conventional bearing systems in which the relative position of the bearing means in the end shield or frame socket is established first and whatever conditions which result from the relative position is locked therein. Experience has shown that, in conventional bearing systems, a wide variety of conditions are locked in for the same relative position due to, among other factors, the bearing geometry, the socket geometry, eccentricity and the retainer geometry, all of which have certain tolerances and dimensional irregularities.

The freely aligning bearing means 60 utilized with the illustrated motor comprises a sleeve bearing 228, which is operatively positioned in the socket 71 or 218, and a bearing retainer member 230. The configuration, as shown, is freely aligning but is prevented from rotating in that the bearing retainer 230 and the sleeve bearing 228 have a plurality of members 232 in the sleeve bearing member 228 and a plurality of complementary antirotation members 234 in the retainer 230 for preventing the sleeve bearing member from rotating but not preventing the sleeve bearing member from freely aligning.

The bearing retainer member 230 has three lands 236, 238, 240 which are mirror images of three lands 220, 222, 224 positioned in the bottom of the bearing socket 218, which supports the sleeve bearing. It has been determined by measurement that it is important that the lands 236, 238, 240 on the retainer and the lands 220, 222, 224 in the end shield bearing socket not be axially aligned in order to provide greater bearing movement. These six lands assure that the contact area between the bearing and the socket and the contact area between the bearing and the retainer allow the bearing to easily align while maintaining the bearing position when a load is applied to the shaft. Basically the six lands insure that there is always contact with the bearing and that the forces are distributed equally to the end shield and the retainer from the bearing.

The illustrated freely aligning bearing means 60 is assembled into bearing sockets 71, 218 of the frame 22 and the end shield 54 respectively and then held in place by an adhesive. Once the bearing means 60 is placed in either socket 71, 218 with the adhesive activator on the end shield or frame and the adhesive on the bearing retainer 230 surfaces, a force designed to be sufficient to seat the bearing retainer and bearing in the socket is applied, thereafter a second fixturing force for establishing a slight preload, is applied. During this period, the adhesive initially sets and is allowed to cure. Once the adhesive has initially set, the bearing retainer and bearing are fixed in the protuberance or socket having the predetermined conditions established by the force applied. The initial adhesive bond between the retainer surface and the socket surface is sufficient to maintain the predetermined conditions and to enable the end shield or the frame to be further processed while the adhesive, which retains the bearing system therein, is completely cured.

It is believed that the predetermined conditions are established and maintained because the adhesive bond between the retainer and the bearing receiving means or socket freely suspends the retainer until preloaded and thus compensates for all the dimensional variations in each component member such as the bearing, the bearing retainer and the bearing receiving means or socket The bearing means is positioned in the socket so that the bearing can align on the shaft, since the entire bearing system can float until the adhesive sets, no high contact forces between the bearing and the bearing retainer are built up between the bearing and the retainer means and the epoxy adhesive fills in the gaps and is set under a predetermined force to precisely establish the predetermined set of conditions.

In the illustrated motor, the frictional force between the bearing and the rotating shaft is not strong enough to withstand the rotational torque, and the bearing 228 without antirotation tabs 234 will rotate in the retainer 230 and wear out the outer periphery of the bearing. The bearing is held loosely in the socket by the bearing retainer, but yet tight enough to accomplish the freely aligning purpose.

The freely aligning bearing means is assembled in a socket according to the following method. First, the socket and the bearing retainer should be free of all dust, dirt and the grease. An adhesive activator, such as preferably Dymax activator 535, is applied to the effective area of the frame or end shield socket 71, 218. A bead of adhesive, such as preferably, Dymax 628 VT adhesive, is applied around the outer diameter of the retainer 230 near the closed end. Immediately after applying the best of Dymax 628 VT, the parts are assembled by rotating the retainer approximately 60 degrees relative to the socket in order to mix the adhesive and the activator. An axial force of preferably approximately 40 pounds is next supplied to the retainer for approximately two to three seconds and preferably approximately 3.5 pounds of pressure for the remainder of a five minute total initial setting time. At the end of the five minute period, the initially set bearing system is placed under ultraviolet light for curing for approximately two minutes in order to cure any adhesive not cured by the activator.

Figure 2B:
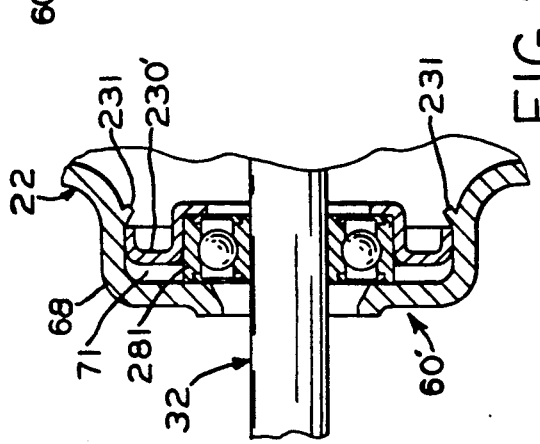
FIG. 2B is a partial sectional view of FIG. 2A illustrating the ball bearing system utilized for engine cooling applications.

As shown in FIG. 2B, the bearings system 60' when used in an engine cooling application is illustrated. As shown, the ball bearing member 228' is positioned in the bearing socket 71 and then is staked in position and retained therein by four tabs 231 staked at a thirty (30) degree (plus or minus 5) angle relative to the internal wall of the protuberance 68.

When locking the ball bearing in position in the bearing socket, it is important that all four tabs 231 are staked simultaneously to insure no radial or axial movement of the bearing and bearing retainer. As with the freely aligning bearing of the present invention, in staking the bearing retainer 230' into position is pressure sensitive as opposed to travel sensitive thus a certain amount of force is exerted on the ball bearing and retainer prior to the staking occurring. This operation, has a similar effect as the pressure applied to the sleeve bearing 248 of the freely aligning bearing means 60 which is adhesively maintained in the bearing socket. After staking, a push test comprising a 5 pound axial force is applied to the inner face of the ball bearing toward the open end of the frame in order to insure that the staking process has been effective.

Mounting Flange

As shown in FIGS. 1, 12A and 12B, two representative mounting flanges 64, 64' of the plurality of mounting flanges used with the motor of the present invention is operatively connected to the frame 22 by an adhesive. The mounting flanges 64, 64' are the only component of the motor which is presently unique to each application. Specifically, at present, each structure to which the illustrated motor is connected is different, thus necessitating a different mounting flange for each application.

In general, each mounting flange is a formed metal part, with some having a plurality of stiffening ribs 66 (FIGS. 2A and 12B) formed therein for raising the low natural vibration frequency of the metal so that the structural noise is reduced.

The mounting flange 64, (engine cooling applications) or 64' (air conditioning or heater applications) comprises a mounting portion 242 having a plurality of mounting apertures or mounting means 244 formed therein and a cupped shaped portion 246 formed circumferentially around a center aperture 248 in which the frame 22 is received. This cup shaped portion 246 has a greater radius from the center of the aperture 248 at one end 250, i.e. an upper end of the cup shaped portion, and gradually tapers down to a smaller radius at the point 252, i.e. a lower end of the cup shaped portion, which is approximately the circumference of frame 22 (FIG. 12A).

One feature of the present frame-flange connection is the unique manner in which each flange 66, 66' is connected to the frame 22. As shown in FIG. 12A, when assembled onto the frame 22, a reservoir 254 (FIG. 12A) for receiving the adhesive is formed between the outer surface 256 of the frame 22 and the inner surface 258 of the cup shaped portion 246 of the mounting flanges 66, 66'. This particular construction provides for the retention of the adhesive in the reservoir during the rotation of the frame relative to the cup shaped portion 246 during the manufacturing process for connecting each mounting flange 66, 66' to the motor frame and for curing the adhesive.

A frame alignment means 260 is operatively positioned on each flange 64, 64' for properly aligning the flange relative to the frame 22 for each particular application. This insures that each mounting means 224 is properly positioned for each application.

During this assembly operation, the outer surface 256 of the frame 22 and/or the inner surface 258 of the flange cup shaped portion 246 have adhesive activator applied thereon. When rotated with respect to each other after the adhesive is inserted into the reservoir, adhesive contact between the surface area of the outer surface of the motor frame adjacent the inner surface of the flange cup is effectuated. After curing, the adhesive bond therebetween has proven to be quite satisfactory.

During the mounting of the flange to the frame, the frame and the flange surfaces are cleaned of contaminants and after the adhesive activator, such as preferably Dymax activator 535, is applied to the inner diameter of the flange and the specific area where the flange will be mounted on the outer diameter of the frame, sufficient time is provided for the solvents and the activator to evaporate. Next, a bead of adhesive, such as preferably Dymax 602 gel, is applied to the frame at the point where the skirt of the flange cup shaped portion will stop. Immediately after the application of the frame which is rotated and moved axially into final position by rotating the flange approximately 90 degrees relative to the frame in order to mix the activator and the adhesive after which they are maintained in the rotating fixture in the proper relative position for the specific application for a time sufficient to allow the combined activator-adhesive to initially set, preferably approximately three minutes. Thereafter, the combined assembly is placed under a curing lamp in order to cure the adhesive not cured by the activator.

While the products and processes herein described constitute preferred embodiments of this invention, it is to be understood that the invention is not limited to these precise products and processes, and that changes may be made therein without departing from the scope of the invention which is defined in the appended claims.

What we claim as new and desired to secure by Letters Patent of the United States is:

1. A structured product dynamoelectric machine utilizing a minimum number of components for a plurality of applications, the machine comprising:
   a unitary frame having an open end, a closed end with a first bearing receiving means therein, and at least two magnet means adhesively retained therein;
   end shield means having second bearing receiving means therein and secured to the frame at its open end thereby to enclose the machine;
   armature means, including a shaft and commutator means having slots, rotatably associated with the frame and the end shield means for interacting with the magnet means;
   brush plate assembly means connected in mounting engagement between the end shield means and the open end of the frame for precisely locating at least two brush means relative to the commutator means;
   conductor means secured in mounting engagement between the end shield means and the open end of the frame adjacent the brush plate assembly means and connected to the brush means for conducting electricity thereto;
   at least one freely aligning bearing means including a bearing and a retainer having predetermined conditions preset and positioned in the second bearing receiving means for freely aligning the shaft;
   bracket means circumferentially disposed about the frame for operatively connecting the machine to any one of the plurality of applications; and
   adhesive cured in place between the retainer and the second bearing receiving means for securing the at least one freely aligning bearing means in the second bearing receiving means thereby to maintain the predetermined conditions preset, and adhesive cured in place between the bracket means and the frame for securing the bracket means in its circumferential engagement about the frame.

2. The machine of claim 1 wherein the brush plate assembly means comprises:
   a brush plate;
   at least two brush box means operatively connected to and positioned on the plate for receiving the brush means;
   a plurality of isolator means respectively interconnected with the plate and received in the mounting engagement between the end shield means and the open end of the frame for reducing vibrations transmitted from the plate to the frame;
   at least two connector means for respectively electrically interconnecting the brush means and the conductor means; and
   at least two means for applying a nearly constant force on the brush means in order to urge the brush means against the commutator means, respectively.

3. The machine of claim 2 wherein once the brush means is fully seated, the force applying means urges the brush means against the commutator means with a constant force.

4. The machine of claim 2 wherein the force applying means comprise at least two ribbon springs to provide the approximately constant forces on the brush means, respectively.

5. The machine of claim 4 wherein the brush means further comprises:
   at least two brushes, each brush constructed so that only a portion of its longitudinal surface initially contacts the commutator means.

6. The machine of claim 5 wherein the brushes respectively have an initial contact point on an approximately symmetrical path with the commutator means so that the ribbon springs respectively develop a relatively high initial pressure for quickly seating the brushes.

7. The machine of claim 5 wherein as one brush tends to deposit material on the surface of the commutator means, the other brush ends to remove the material deposited thereby.

8. The machine of claim 6 wherein the brushes have a circumferential surface spanning across at least two adjacent commutator means slots so that during operation no brush edge catches in the commutator means slots.

9. The machine of claim 8 wherein each brush means has a contoured surface for interacting with the commutator means.

10. The machine of claim 2 wherein the brush plate includes;
    at least four D slots for operatively connecting each brush box means to the brush plate.

11. The machine of claim 10 wherein the brush box means is connected to the brush plate through the D slots so that the brush box means is precisely aligned relative to the commutator means while minimizing stress to the brush plate.

12. The machine of claim 1 wherein the brush plate assembly means further comprises:
    at least two brush boxes, operatively connected to the brush plate assembly means, for receiving and precisely aligning the brushes relative to the brush plate assembly means and the commutator means.

13. The machine of claim 2 wherein the end shield means further comprises:
    means for receiving the conductor means, and a plurality of means for respectively retaining the isolator means the end shield means being connected to the frame by staking.

14. The machine of claim 2 wherein the frame further comprises:
positioning means in the open end for receiving the end shield means, and a plurality of mounting means in the open end for respectively receiving the isolator means, the closed end having at least one air cooling passage, a bearing socket and a shaft receiving aperture formed therein.

15. The machine of claim 1 wherein the commutator further comprises:
an inner insulating portion having a bore formed therein adhesively bonded to the shaft;
an outer electrical conduction portion adhesively bonded to the inner insulating portion and having a plurality of tangs; and
a core adhesively bonded to the shaft and including winding means for connection in circuit relation with the tangs, respectively.

16. A structured product DC motor utilizing a minimum number of components for a plurality of applications, the DC motor comprising:
a frame having open and closed ends, the open end having end shield positioning means and isolator mounting means operatively formed therein, the closed end having cooling means, a first bearing receiving means and a shaft receiving aperture formed therein;
first bearing means, operatively positioned in the first bearing receiving means;
at least two magnet means having gaps therebetween operatively adhesively connected to the frame and being positioned in the frame so that noise generated inside the frame and transmitted between the gaps toward the closed end of the frame is prevented from directly exiting the frame through the cooling means;
an armature means comprising:
an approximately uniform shaft having end play movement in the DC motor and including a bearing surface at one end and an applications connector means at the other end, the shaft interacting with the first bearing means adjacent the other end of the shaft;
a plurality of laminations having slots forming a core positioned on the shaft;
a spacer operatively positioned on the shaft between the bearing surface and the laminations;
insulating means distributed over the core, the spacer and a portion of the shaft;
a commutator including an inner insulating portion and an outer electrical conduction portion having tangs with the inner insulating portion being adhesively bonded to an uninsulated portion of the shaft between the bearing surface and the core;
electrical conducting means operatively positioned in part in the core and being operatively connected to the commutator tangs;
at least two oil slingers including a cup shaped portion, operatively positioned proximate each end of the shaft, one adjacent the spacer and the other adjacent the commutator;
end play control means, operatively positioned between the cup shaped portion of one oil slinger and the commutator, for adjusting the end play movement of the shaft to within a predetermined range;
a brush plate assembly comprising;
at least two brushes each having electrical connector means operatively connected thereto;
a brushplate having at least eight D-slots operatively formed therein;
at least two brush boxes, operatively connected to the brush plate by members utilizing the D slots as connecting means, for operatively containing the brushes therein and for positioning the brushes relative to the outer electrical conducting portion of the commutator;
a ribbon spring operatively connected to each brush, for urging each brush against the outer electrical conduction portion of the commutator at an approximately constant force per unit area of contact therebetween; and
electrical conductor means, operatively connected to the brush connector means, for conducting power to the DC motor;
an end shield, including electrical conductor receiving means corresponding to the electrical conductor positioning means, isolator retaining means corresponding to the isolator mounting means, and a second bearing receiving means;
a set of resilient isolators connected to the brush plate and received in engagement between the isolator retaining means and the isolator mounting means, respectively;
second bearing means including a sleeve bearing and a retainer, operatively positioned in the second bearing receiving means, for operatively interacting with the bearing surface of the shaft, the retainer being adhesively held in position in the second bearing receiving means after the establishment of a predetermined set of conditions therebetween, the same predetermined set of conditions being repeatedly duplicated in a plurality of individual bearing means in a plurality of individual bearing receiving means despite dimensional variations in each individual bearing, each individual retainer and each individual bearing receiving means;
axial vibration reduction means including thrust compensation means, operatively positioned between each oil slinger and each of the first and second bearing means, for reducing the axial vibration of the armature means, the armature means being biased toward the closed end of the frame such that axial movement of the armature means between the first bearing means and the second bearing means is minimized; and
a plurality of different mounting flanges, operatively connected to the frame, for positioning the motor relative to any one of the plurality of applications, each mounting flange comprising:
a mounting portion having a central aperture and at least two mounting means formed therein; and
a cup shaped portion having an upper and a lower end and an inner and an outer surface, operatively connected to the central aperture at its lower end, the radius of the upper end being greater than the radius of the lower end, the inner surface of the cup shaped portion between the upper and the lower ends gradually decreasing from a maximum of the upper end radius to a minimum of the lower end radius, the upper end having a lip portion so that when any one of the plurality of different mounting flanges is operatively positioned on the frame, the cup shaped portion of the each mounting flange forms a reservoir for receiving an adhesive, the adhesive interacting with an adhesive activator applied to the inner surface of the cup shaped portion and the outer surface of the frame whereby the each mounting flange and the frame are adhesively bonded together.

17. The DC motor of claim 16 wherein each brush includes a longitudinal surface with only a portion of the longitudinal surface initially engaging the outer electrical conduction portion of the commutator.

18. The DC motor of claim 16 wherein the initial engagement between each brush and the outer electrical conduction portion of the commutator is approximately symmetrical so that each ribbon spring develops a relatively high initial pressure for quickly seating the brush connected thereto.

19. The DC motor of claim 16 wherein one of the brushes tends to deposit material on the outer electrical conduction portion of the commutator, and another of the brushes tends to remove the deposited material.

20. The DC motor of claim 16 wherein the commutator includes a plurality of circumferentially spaced slots intersecting the outer electrical conduction portion, and the brushes surface than the respectively include a contact surface engaged at least in part with the outer electrical conduction portion on the commutator means, and at least one edge arranged at least adjacent the contact surface, the contact surface spanning at least an adjacent pair of the slots so that the at least one edge does not catch in any of the commutator slots.

21. The DC motor of claim 20 wherein each brush includes another edge generally opposite the at least one edge and arranged at least adjacent the contact surface, the contact surface being contoured to receive the outer electrical conduction portion of the commutator.

22. The DC motor of claim 16 wherein the brush box is connected to the brush plate through the D slots so that the brush box is aligned relative to the communicator while minimizing stress to the plate.

23. The DC motor of claim 16 wherein the frame comprises:
sufficient flux carrying material sized to occupy no more than a preselected space therefor while providing sufficient flux carrying material to be at the edge of magnetic saturation upon energization of the DC motor.

24. The DC motor of claim 16 wherein each magnet means further comprises:
means for effectuating at least two contact points with the frame so that there is no rocking movement between each magnet means and the frame thereby stabilizing each magnet means with respect to the frame.

25. The DC motor of claim 24 wherein each magnet means is thicker in the center and tapers therefrom to each end thereof so that reluctance torque is reduced.

26. The DC motor of claim 24 wherein an air gap between the laminations and the magnet means is less at the center of each magnet means and gradually increases therefrom to each end of the magnet means.

27. The DC motor of claim 26 wherein each magnet means includes an outer surface and an inner surface respectively defined about different focus points, and the air gap being defined between the inner surfaces and the core so as to increase from a minimum at the center of each magnet means to a maximum at each end of each magnet means.

28. An armature means for an electric motor having a frame bearing means and an end shield bearing means the armature comprising:
an approximately uniform shaft having a bearing surface at one end and an applications connector means at the other;
a plurality of laminations having slots forming a core, the core being inductively heated prior to being operatively positioned on the shaft;
a spacer operatively positioned on the shaft between the bearing surface and the laminations;
insulating means operatively, approximately uniformly distributed over the laminations, the spacer and at least a portion of the shaft;
a commutator, including an inner insulating portion and an outer electrical conduction portion, having tangs operatively adhesively bonded to the shaft between the bearing surface end and the laminations;
electrical conducting means operatively wound between the lamination slots and being operatively connected to the commutator;
at least two oil slingers, including a cup shaped portion, operatively positioned proximate each end of the shaft, one adjacent the spacer and the other adjacent the commutator; and
end play compensation means, operatively positioned between the cup shaped portion of one oil slinger and the commutator, for adjusting the end play variation of the shaft in a frame to within a predetermined range.

29. A dyanamoelectric machine comprising:
a frame;
an end shield secured to said frame;
a set of permanent magnet elements secured to said frame;
armature means for magnetic interaction with said permanent magnet material elements and including a shaft, and a commutator secured to said shaft;
a pair of bearing means respectively arranged in said frame and said end shield for rotatably supporting said shaft, at least said bearing means in said end shield including a self-aligning bearing and a retainer therefor, said bearing being seated in self-aligning so as to freely align with said shaft, and said retainer being adhesively secured to another part of said end shield to retain predetermined conditions preset between said retainer, said bearing and said part of said end shield;
a brush plate assembly means disposed within said frame for associating a set of brushes with said commutator;
a set of isolator means secured between said end shield and said frame and connected with said brush plate assembly means for resiliently supporting said brush plate assembly means within said frame, respectively; and
mounting bracket means for the dynamoelectric machine including a flange extending generally circumferentially about said frame and adhesively secured thereto.

* * * * *